(12) United States Patent
Hsu et al.

(10) Patent No.: US 11,820,848 B2
(45) Date of Patent: Nov. 21, 2023

(54) FUNCTIONAL POLYOLEFIN POLYMERS AND MANUFACTURE THEREOF

(71) Applicant: ADVANCED POLYOLEFIN TECHNOLOGIES LLC, State College, PA (US)

(72) Inventors: Tim Hsu, State College, PA (US); Minren Lin, State College, PA (US); Tze-Chiang Chung, State College, PA (US)

(73) Assignee: ADVANCED POLYOLEFIN TECHNOLOGIES LLC, State College, PA (US)

( * ) Notice: Subject to any disclaimer, the term of this patent is extended or adjusted under 35 U.S.C. 154(b) by 157 days.

(21) Appl. No.: 17/190,553

(22) Filed: Mar. 3, 2021

(65) Prior Publication Data

US 2021/0277159 A1 Sep. 9, 2021

Related U.S. Application Data

(63) Continuation of application No. PCT/US2021/020203, filed on Mar. 1, 2021.

(60) Provisional application No. 62/984,611, filed on Mar. 3, 2020.

(51) Int. Cl.
*C08F 255/02* (2006.01)
*C08L 51/00* (2006.01)

(52) U.S. Cl.
CPC .......... *C08F 255/02* (2013.01); *C08L 51/003* (2013.01); *C08L 2205/025* (2013.01)

(58) Field of Classification Search
CPC ...... C08L 51/06; C08L 51/003; C08F 216/04; C08F 210/06; C08F 216/14; C08F 4/65927; C08F 8/14
See application file for complete search history.

(56) References Cited

U.S. PATENT DOCUMENTS

| 5,401,805 A | 3/1995 | Chung et al. |
| 5,650,468 A | 7/1997 | Vandevijver et al. |
| 5,866,659 A | 2/1999 | Chung et al. |
| 5,976,652 A | 11/1999 | Krause |

(Continued)

FOREIGN PATENT DOCUMENTS

| KR | 10-2019-0135541 A | 12/2019 |
| WO | 2018/202562 A1 | 11/2018 |

OTHER PUBLICATIONS

Felix et al., "The Nature of Adhesion in Composites of Modified Cellulose Fibers and Polypropylene," Journal Appl. Polymer. Sci. 42:609-620 (1991).

(Continued)

*Primary Examiner* — Mark S Kaucher
(74) *Attorney, Agent, or Firm* — BakerHostetler

(57) ABSTRACT

Polyolefins having the same or different functional groups covalently bound to the polyolefin, such as polyolefins having hindered phenol groups bound thereto, can be prepared by from a maleic anhydride modified polyolefin, with or without a coupling agent, and a hindered phenol reagent under heat, e.g., by heating the components to at least about 170° C., such as by reactive extrusion. A polyolefin having hindered phenol groups can be added to the components as a stabilizer prior to or during reacting the components together under heat.

20 Claims, 3 Drawing Sheets

(56) References Cited

U.S. PATENT DOCUMENTS

| | | |
|---|---|---|
| 6,699,949 B2 | 3/2004 | Chung |
| 2008/0214707 A1* | 9/2008 | Gong .................. C08F 8/32 524/188 |

OTHER PUBLICATIONS

Zhu et al., Polyethylene Containing Antioxidant Moieties Exhibiting High Thermal-Oxidative Stability for High Teperature Applications, Polymer, 146:101-108 (2018).

Zhang et al. "Increasing Polypropylene High Temperature Stability by Blending Polypropylene-Bonded Hindered Phenol Antioxidant," Macromolecules, 51:1927-1936 (2018).

Chung, "Expanding Polyethylene and Polypropylene Applications to High-Energy Areas by Applying Polyolefin-Bonded Antioxidants," Macromolecules, 52:5618-5637 (2019).

Hopmann et al "Introduction to Reactive Extrusion", Reactive Extrusion: Principles and Applications, First Edition. Ed Beyer and Hopmann, Published 2018 by Wiley-VCH Verlag GmbH & Co. KGaA at pp. 3-10.

Zhang et al., "Polypropylene Copolymer Containing Cross-Linkable Antioxidant Moieties with Long-Term Stability Under Elevated Temperature," Macromolecules, 50:7041-7051 (2017).

International Search Report issued in corresponding International Application No. PCT/US2021/020203 dated Jun. 22, 2021.

Written Opinion issued in corresponding International Application No. PCT/US2021/020203 dated Jun. 22, 2021.

Zhang, Gang et al., "Synthesis of Functional Polypropylene Containing Hindered Phenol Stabilizers and Applications in Metallized Polymer Film Capacitors", Macromolecules 2015, vol. 48, Issue 9, pp. 2925-2934 (published online: Apr. 24, 2015).

Zhang, Gang et al., "Developing Polypropylene Bonded Hindered Phenol Antioxidants for Expanding Polypropylene Applications in High Temperature Conditions", Journal of Material Sciences & Engineering, 2017, vol. 6, Issue 6, pp. I-9(published online: Nov. 24, 2017).

* cited by examiner

FUNCTIONAL POLYOLEFIN POLYMERS AND MANUFACTURE THEREOF

CROSS-REFERENCE TO RELATED APPLICATION

This application is a continuation of International Application No. PCT/US2021/020203, with an international filing date of 1 Mar. 2021, which claims the benefit of U.S. Provisional Application No. 62/984,611, filed 3 Mar. 2020, the entire disclosures of each of which are hereby incorporated by reference herein.

TECHNICAL FIELD

The present disclosure relates to polyolefins having the same or different functional groups covalently bound to the polyolefin, such as polyolefins having hindered phenol groups bound thereto, and processes for their manufacture.

BACKGROUND

Polyolefins, such as polypropylene (PP) and polyethylene (PE), are a versatile family of polymers mostly used in commodity applications having advantages of low cost, good processability, good thermal and electric insulation characteristics, low moisture sensitivity, excellent recyclability, etc. However, polyolefin, including PE and PP, products are not used in applications that require long-term exposure to elevated temperatures, high electric fields, organic solvents, and combinations of those, due to both chemical and physical stability concerns (See Macromolecules, 2019:52:5618-5637).

To improve the thermal stability of polyolefins, it is common practice to add various additives, including a small amount (<0.5 wt %) of antioxidants and UV-stabilizers, in commercial polyolefin products immediately after polymerization. Hindered phenol (HP) antioxidants, such as octadecyl-3-(3,5-di-tert-butyl-4-hydroxyphenyl)-propionate (Irganox® 1076) and pentaerythritol tetrakis(3-(3,5-di-tert-butyl-4-hydroxyphenyl)propionate) (Irganox®1010), are commonly admixed with polyolefin products. The blended antioxidants can prevent polyolefins from chain thermal-oxidative degradation during melt processes, in which the molten mixture is constantly mixed under elevated temperature with a uniform phase for only a short processing time (i.e., a few minutes). However, it is difficult to maintain a homogeneous mixture between antioxidants, which are typically polar molecules and non-polar polyolefins, particularly semicrystalline polyethylene (PE) or polypropylene (PP) and in solid state form. This incompatibility also contributes to the continuous diffusion of additives from bulk polyolefins to surface regions, which accelerates when the material is exposed to solvents, heat, or constant (strong) electric fields. It is thus difficult to maintain a minimum effective antioxidant concentration throughout polyolefins such as PE and PP products.

To address some of the shortcomings of antioxidant incompatibility and diffusion, Chung et al. reported a laboratory scale approach to prepare polyolefins having covalently bound hindered phenol. The reported process involved a solution-based co-polymerization of propylene or ethylene monomers with a protected alcohol monomer, deprotecting the alcohol and then esterifying with 3,5-bis (tert-butyl)-4-hydroxyphenylpropionic acid (HP) to form the corresponding PP—HP or PE-HP copolymers (See Macromolecules, 2017:50:7041-7051 and Polymer 2018:146:101-108). However, solution-based synthesis involving polymerization of co-monomers is relatively expensive for a large scale operation and generally not suitable for commercial production.

In addition to low thermal stability, polyolefins are excluded from many high-end specialty applications that commonly require materials with multiple performance functions. The limitations and shortcomings of polyolefins stem, in part, from a lack of polar functionality and structure diversity, which are compounded with the long-standing challenges in the chemical modification (functionalization) of polyolefins.

Maleic anhydride (MA) modified polypropylene (PP-MA) is commercially available and used in applications, such as glass fiber reinforced PP, anticorrosive coatings for metal pipes and containers, multilayer sheets of paper for chemical and food packaging, and polymer blends. PP-MA can be prepared by chemical modification of pre-formed PP under free radical conditions using organic peroxides. Due to the inert nature of the PP structure and poor control of the free radical reaction, this type of high temperature MA grafting reaction results in undesirable side reactions. Another way to prepare PP-MA involves solution processes, which is relatively expensive and not suitable for commercial production.

Some approaches were reported to introduce OH groups to polyolefins for improving their adhesion to substrates or inorganic fillers. However, PP—OH polymers are not available commercially.

Hence a continuing need exists to improve thermal, mechanical, electrical and other properties of polyolefins for increasingly demanding application in economical and commercially suitable processes.

SUMMARY OF THE DISCLOSURE

Advantages of the present disclosure include polyolefins having one or more functional groups covalently bound to the polyolefin, such as polyolefins having hindered phenol groups and optionally other functional groups covalently bound to the polyolefin. Another advantage includes processes for high throughput manufacture of polyolefins having one or more functional groups covalently bound thereto which are suitable for large scale manufacturing.

These and other advantages are satisfied, at least in part, by a functional polyolefin having the following Formula (I):

$$PO-(HP)_a(F1)_b(F2)_c(F3)_d(F4)_e \qquad (I)$$

wherein PO represents a polyolefin; HP represent a hindered phenol group; F1 represents a maleic anhydride (MA) residue, and/or a reaction residue formed from a maleic anhydride residue (X), e.g. $(F1)_b$ can also be re-written as $(MA)_{b2}(X)_{b3}$, where the variable b2 and b3 sum to the value of b; F2 represents a hydroxyl group (—OH); F3 represents an epoxy group (—CHOCH$_2$); and F4 represents an amine (primary and/or secondary) group. The variables a, b, c, d, and e each represent mole percent (mol %) relative to the olefin repeating unit in the polyolefin chain. The variables a and b independently can range from 0 to about 20 mol %, the variables c and e independently can range from 0 to about 40 mol %, provided the sum of c and e is no more than 40 mol %, and the variable d can range from 0 to about 20 mol %, provided at least two variables of a, b, c, d, and e are greater than 0, e.g., at least variables a and b are greater than 0, e.g., the variables a and b independently range from greater than 0 to about 20 mol %, such as from greater than 0 to about 10 mol %.

In an aspect of the present disclosure, a functional polyolefin can have covalently bound thereto: (i) hindered phenol groups and (ii) maleic anhydride residues, or reaction residues of maleic anhydride residues, or both maleic anhydride residues and reaction residues of maleic anhydride residues. The functional polyolefin can further have covalently bound thereto any one of hydroxy groups (—OH groups), epoxy groups (—CHOCH$_2$ groups), or amine groups (e.g., —NH$_2$ or —NHR$_5$ groups). In certain embodiments, the hindered phenol groups are covalently bound to the polyolefin through a coupling agent. The coupling agent can be a polymer or compound. The hindered phenol groups can be covalently bound to the polyolefin through by a coupling agent having a plurality reactive groups. Such reactive groups of coupling agents can include hydroxyl groups (alkyl hydroxy groups and/or aromatic hydroxy groups such as phenols), epoxy groups, primary amine groups, and/or secondary amine groups. In other embodiments, the hindered phenol groups are covalently bound to the polyolefin through a reaction residue formed from a maleic anhydride residue on the polyolefin and a hindered phenol reagent.

Another aspect of the present disclosure is to form cross linked materials from functional polyolefins of the present disclosure. Advantageously, polyolefins having hindered phenol groups can crosslink upon heating under the oxidative condition through coupling of the hinder phenol group.

Another aspect of the present disclosure is to combine the functional polyolefin with other polymeric materials, e.g., different polyolefins, such as non-functional polyolefins, including, without limitation, polyethylene and polypropylene and their various commercial variants, as a blend of the respective polymers. In such blends, functional polyolefins of the present disclosure can be used to improve thermal stability characteristics of the blend. Advantageously, the blends can have an onset degradation temperature of no less than about 290° C., e.g., no less than about 300° C., 310° C., 320° C., 330° C., 340° C., etc. and values therebetween.

In another aspect of the present disclosure, functional polyolefins can be prepared by reacting the following components together under heat: (a) a polyolefin having a plurality of reactive groups, e.g., a plurality of maleic anhydride residues, hydroxyl groups, epoxy groups, amine groups etc.; and (b) a hindered phenol reagent that can react with the reactive groups of the polyolefin; to produce a functional polyolefin having hindered phenol groups covalently bound thereto. In addition, certain starting functional polyolefins, e.g., a polyolefin having the plurality of reactive groups, can be prepared by heating a maleic anhydride modified polyolefin with a coupling agent having a plurality of reactive groups that can react with the maleic anhydride modified polyolefin to form the polyolefin having a plurality of reactive groups. The coupling agent can comprise a hydroxylated polymer having a plurality of hydroxyl groups, a polyamine having a plurality of amine groups, a compound have a plurality of reactive groups, e.g., hydroxyl groups (alkyl hydroxy groups and/or aromatic hydroxy groups such as phenols), epoxy groups, primary amine groups, and/or secondary amine groups, for example.

For any of the above preparations, a polyolefin having hindered phenol groups covalently bound thereto can be added to the components prior to or during reacting the components together under heat. Further, a non-functional polyolefin can be combined with the components prior to or during reacting the components together under heat to dilute the components and/or form a product blend.

The above preparations can be carried out under reactive compounding conditions, e.g., reactive extrusion, in which the polyolefin having a plurality of reactive groups is in a molten state, such as heating the components to at least about 170° C., e.g., from about 180° C. to about 280° C. In addition to reactive compounding, the above preparations can be carried out under solid state processes, in which particles of the polyolefin having a plurality of reactive groups are heated with a solvent mixture including the other components. Such solid state processes can be carried out at a temperature of about 170° C. or higher, e.g., from about 180° C. to about 260° C.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
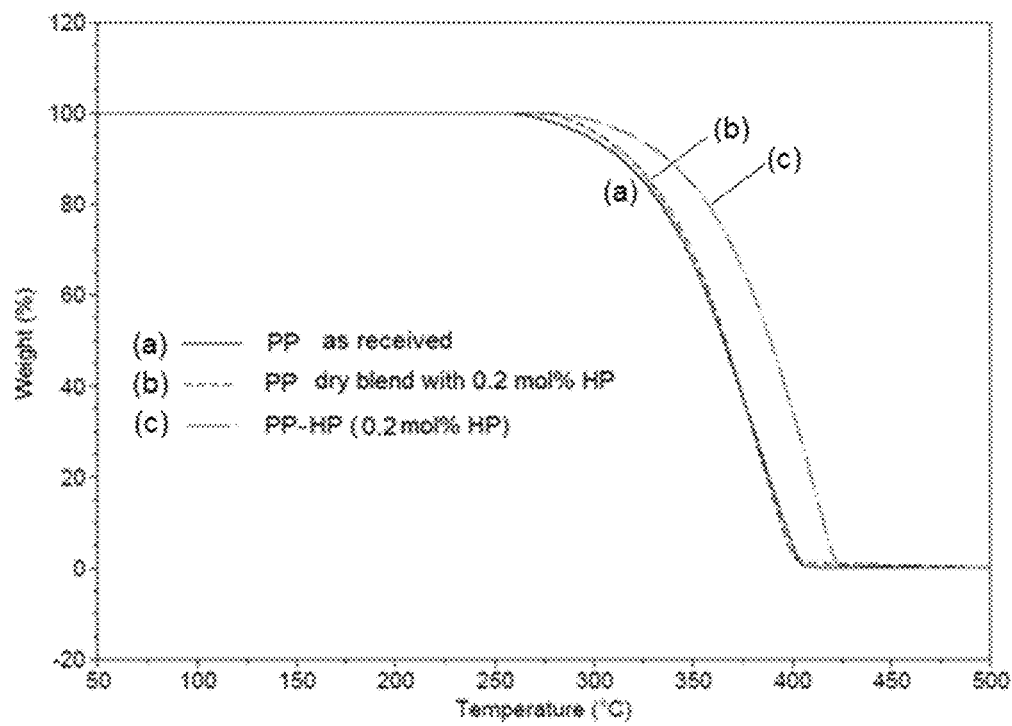
FIG. 1 is a plot comparing TGA degradation curves of: (a) a commercial capacitor grade PP as received, (b) a dry-mixed commercial PP with HP additive (Irgonox 1010), and (c) a chemically-bonded HP functionalized PP—HP prepared according to aspects of the present disclosure.

The present disclosure relates to polyolefins having one or more functional groups, i.e., functional polyolefins, and their preparation. Advantageously, functional polyolefins of the present disclosure can incorporate several polar functionalities in the polymer structure such as hindered-phenol groups (HP). Such covalently bound HP groups act as an antioxidant and improves the thermal stability of the polymer.

While processes are known for the preparation of certain polyolefins having hindered phenols, the processes rely on a solution-based, batchwise polymerization of co-monomers, which is relatively expensive and not suitable for large scale manufacturing or mass production. Further, chemically modifying polypropylene grafted maleic anhydride in the solid or molten state requires temperatures around or above the degradation temperature of the polymer thereby limiting, if not preventing, such processes.

However, it was found that maleic anhydride modified polyolefins can be further chemically modified in the solid or molten state when a polyolefin having hindered phenol groups is present. Thus, polyolefins having hindered phenols can be prepared from maleic anhydride modified polyolefins in the solid or molten state when a relatively small amount of polyolefins having hindered phenols is present in the reaction mixture. The initial polyolefin hindered phenol material can be prepared from a solution based process. But once an initial polyolefin hindered phenol is prepared, additional polyolefin having covalently bound hindered phenol (PO(HP)) can be produced in the solid or molten state thereby empowering large scale and mass production of PO(HP) as well as other functional polyolefins.

An aspect of the present disclosure includes polyolefins having the same or different functional groups covalently bound to the polyolefin. The functional polyolefins can be advantageously prepared by solid state processes and by reactive compounding. As used herein, reactive compounding refers to chemically reacting components including at least one polyolefin with mixing to form covalent bonds among the components in which at least the polyolefin is in a molten state. Reactive compounding as used herein includes reactive extrusion, e.g., chemically reacting a polyolefin in an extruder and discharging the products. For example, reactive extrusion with a twin screw extruder can readily melt, homogenize, and pump polymers through a die via co rotating, intermeshing twin screws. During reactive extrusion, components can react in the extruder to form the functional polyolefins of the present disclosure. An advantage of reactive compounding in general and reactive extrusion, in particular, in practicing aspects of the present disclosure is a mass production, high throughput of functional polymer.

During reactive compounding it is preferably to have at least one of the polyolefin components in a molten state, e.g., the components are heated to at least about 180° C., such as from about 180° C. to about 280° C. In some aspects, functional polyolefins of the present disclosure can be prepared by subjecting the components to reactive compounding through an extruder, i.e., reactive extrusion. In reactive extrusion processes, the components can have a reaction temperature of at least about 200° C., e.g., at least about 210° C., 220° C., 230° C., 240° C., 250° C., 260° C., 270° C., 280° C. etc. and values therebetween. As an example, functional polyolefins of the present disclosure can be prepared by subjecting the components to reactive compounding through an extruder in which the components are heated to a temperature of from about 200° C. to about 280° C., e.g. from about 200° C. to about 260° C.

In addition to reactive compounding, functional polyolefins of the present disclosure can be prepared by solid state processes. Such processes can include mixing the components together including a polyolefin with a solvent to form a slurry of wetted polyolefin particles and heating the slurry to effect reactions. Such processes can also include mixing the components together including a polyolefin with a solvent to form a suspension of polyolefin particles in the solvent and heating the suspension. Such solid state processes can generally be carried out at a lower temperature than reactive extrusion since the polyolefin is not heated to a temperature need for it to flow, but such solid state processes are not as effective for large scale, mass production. Such solid state processes can be carried out at temperature of about 170° C. or higher, e.g., from about 180° C. to about 260° C.

Additives, fillers, or engineering polymers optionally can be combined with the functional polyolefins of the present disclosure and blends thereof to achieve various polymer compositions and material properties. The functional polyolefins and compositions thereof can be formed as granules which are an advantageous form for use in other processes. It is also possible to directly carry out injection molding or extrusion of the functional polyolefins and compositions thereof to form sheets or profiles to fulfill specific performance requirements.

In an aspect of the present disclosure, a functional polyolefin can have the following Formula (I):

$$PO-(HP)_a(F1)_b(F2)_c(F3)_d(F4)_e \quad (I)$$

wherein PO represents a polyolefin, e.g. a polyethylene, polypropylene; HP represents a hindered phenol group; F1 represents a maleic anhydride residue and/or a reaction residue of maleic anhydride residue; F2 represents a hydroxyl group (OH); F3 represents an epoxy group (—CHOCH$_2$); F4 represents an amine group (e.g., a primary amine group (NH$_2$) and/or secondary amine (NHR$_5$ group); R$_5$ can represent a substituted or unsubstituted alkyl group such as a C$_{1-30}$ alkyl, e.g., a C$_{1-8}$ alkyl, which can be substituted with a thiol, ether, ester linking groups within the C$_{1-30}$ alkyl group. The variables a, b, c, d, and e each represent mole percent (mol %) relative to the olefin repeating unit in the polyolefin chain. The variables of each of a and b independently can range from 0 to about 20 mol %, e.g., from 0 and up to about 15 mol %, up to about 10 mol %, up to about 5 mol %, etc. and values therebetween. The variables of each of c and e independently can range from 0 to about 40 mol %, e.g., from 0 to about 30 mol %, from 0 to about 20 mol %, from 0 to about 10 mol %, etc. and values therebetween, providing the sum of c and e is no more than 40 mol %. The variable d can range from 0 to about 20 mol %, e.g., from 0 to about 10 mol %, from 0 to about 5 mol %, etc. For Formula (I), at least two variables are greater than 0, e.g., at least variables a and b are greater than 0, e.g., the variables a and b independently range from greater than 0 to about 20 mol %, e.g., from greater than 0 and up to about 15 mol %, up to about 10 mol %, up to about 5 mol %, etc.

In some instances, the variables a, b, c, d, and e, independently can each range from 0 to about 10 mol %, provided at least two variables are greater than 0, e.g., at least variables a and b are greater than 0, e.g., the variables a and b independently range from greater than 0 to about 10 mol %. In other instances, the variable a can range from about 0.1 mol % to about 10 mol %, e.g., from about 0.1 mol % to about 3 mol %, or about 0.2 mol % to about 1.5 mol %; b can range from greater than 0 to about 10 mol %, such as from about 0.01 mol % to about 5 mol %; c and e independently can range from 0 to about 10 mol %, such as about 0.5 mol % to about 3 mol %; and d can range from 0 to about 5 mol %, such as from about 0.01 mol % to about 2 mol %.

As noted above F1 can represent a maleic anhydride residue (MA) on the polyolefin. Hence, F1 refers to the residue that results from a maleic anhydride modified polyolefin which is in effect a pendant group (e.g., a succinic anhydride pendant group) on the polyolefin after a free radical reaction between maleic anhydride and a polyolefin. By convention, such a group is called a maleic anhydride residue or group since the starting material is maleic anhydride. F1 can also represent a reaction residue that results from a reaction of a maleic anhydride residue (MA) on the polyolefin with another reactive group on another material to form a maleic anhydride reaction residue (X). Such residues include reaction adducts, e.g., addition of reactants without loss of atoms, and other reaction products, e.g., addition of reactants with a loss of atoms, such as from condensation reactions with the maleic anhydride residue on the polyolefin and another reactive group. Hence, $(F1)_b$ can also be re-written as $(MA)_{b2}(X)_{b3}$, where the variables b2 and b3 sum to the value of b, and where X represents a reaction residue of maleic anhydride residue on the polyolefin with a reactive group such as, for example, a hydroxyl group, a primary amine group, a secondary amine group, etc. on a coupling agent or on a hindered phenol reagent. X can thus represent an ester, amide, imide, etc.

In some aspects, a polyolefin or polyolefin chain of a functional polyolefin can have the following Formula (II):

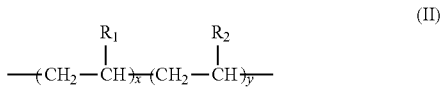

(II)

wherein $R_1$ represents H or $CH_3$; $R_2$ represents H or a $C_{1-10}$ substituted linear, branched, or cyclic alkyl or aryl moiety, x is an integer of at least 100, e.g., at least 1,000 (such as from 100 to about 50,000), y is an integer of at least 10, e.g., at least 100 (such as from 10 to about 10,000). In some embodiments, x is an integer of at least 100, e.g., at least 500, at least 1,000, and up to about 100,000 such as up to about 50,000 and values therebetween; and y is an integer of at least 10, e.g., at least 100, at least 500, at least 1,000 and up to about 50,000, up to about 20,000, up to about 10,000 and values therebetween. Such polyolefins include, without limitation, a polyethylene and a polypropylene and various commercial variants thereof.

In an aspect of the present disclosure, a functional polyolefin can have covalently bound thereto: (i) hindered phenol groups and (ii) maleic anhydride residues, or reaction residues of maleic anhydride residues, or both maleic anhydride residues and reaction residues of maleic anhydride residues. The functional polyolefin can further have covalently bound thereto any one of hydroxy groups (—OH groups), epoxy groups (—CHOCH$_2$ groups), or amine groups (—NH$_2$ or —NHR$_5$ groups). Advantageously, functional polyolefin having hindered phenol groups covalently bound thereto can have an onset degradation temperature of no less than about 290° C., e.g., no less than about 300° C., 310° C., 320° C., 330° C., 340° C., etc. and values therebetween.

In certain embodiments, the hindered phenol groups are covalently bound to the polyolefin through a coupling agent. For example, the hindered phenol groups can be covalently bound to the polyolefin through a reaction residue formed from a maleic anhydride residue on the polyolefin and a reactive group on a coupling agent. In this example, the hindered phenol groups are covalently bound to the coupling agent. The coupling agent can be a polymer or compound.

In practicing certain aspects of the present disclosure, functional polyolefins can be prepared by reacting the following components together under heat: (a) a polyolefin having a plurality of reactive groups, e.g., a plurality of maleic anhydride residues or groups, hydroxyl groups, epoxy groups, amine groups etc.; and (b) a hindered phenol reagent that can react with the reactive groups of the polyolefin; to produce a functional polyolefin having hindered phenol groups covalently bound thereto.

Scheme 1 below illustrates a process of preparing a functional polyolefin having hindered phenol groups bound thereto via a coupling agent.

Scheme 1. A Process of preparing a functional polyolefin with a coupling agent

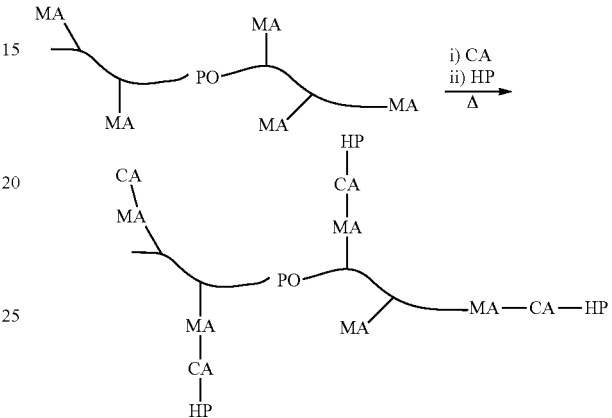

As shown in Scheme 1 above, a maleic anhydride modified polyolefin (PO(MA)) can be combined with a coupling agent (CA), followed by reacting a hindered phenol (HP) reagent to produce a functional polyolefin having hindered phenol groups covalently bound to the coupling agent. Scheme 1 shows some maleic anhydride residues on the polyolefin chain that have not reacted as an example. In principle, all maleic anhydride residues are available to react with the coupling agent. Further, more than one polyolefin chain can be covalently bound to the same coupling agent depending on the number of reactive groups on the coupling agent. The polyolefin chains can be represented by Formula (II) above.

In the first step of Scheme 1, the maleic anhydride modified polyolefin (PO(MA)) is combined with a coupling agent (CA) to form a polyolefin having a plurality of reactive groups. The PO(MA) and CA can be reacted together under heat, e.g., by heating the components to at least about 180° C., such as by reactive extrusion. Preferably, a polyolefin having hindered phenol groups is added to the components prior to or during reacting the components together under heat. One or more non-functional polyolefins can be added to the components as a diluent prior to or during reacting the components.

The starting maleic anhydride modified polyolefin is not particularly limited to molecular weight or degree of maleic anhydride residues or location of the maleic anhydride residues, which can be along the backbone or end of the polyolefin or grafted as a chain thereto or any combinations thereof. Commercially available materials can be used. Such as commercially available polyethylene and/or polypropylene grafted maleic anhydride.

The coupling agent (CA) has a plurality of reactive groups, e.g., at least two, in which at least one of the reactive groups of the coupling agent can react with the maleic anhydride residue of the polyolefin. After coupling to the polyolefin, the coupling agent has at least one available reactive functional group remaining to react with a hindered phenol reagent. The coupling agent can be a polymer or compound, provided it has the plurality reactive groups. Such reactive groups of coupling agents include hydroxyl groups (alkyl hydroxy groups and/or aromatic hydroxy groups such as phenols), epoxy groups, primary amine groups, and/or secondary amine groups. Such coupling agents can include, for example, a hydroxylated polymer having a plurality of hydroxyl groups, e.g., a poly(ethylene-co-vinyl alcohol) (EVOH) copolymer, a phenoxy resin, a polyamine such as natural polyamines, e.g., spermidine, spermine, synthetic polyamines such as diethylenetriamine, triethylenetetramine, tris(2-aminoethyl)amine, 1,1,1-tris(aminoethyl)ethane, polyethylenimine, a polyethylene polyamine, an alkyl diol, an aromatic diol, an alkyl diamine, an aromatic diamine, etc.

Upon preparing a polyolefin having a plurality of reactive groups, it can react with a hindered phenol reagent under heat, e.g., by heating the components to at least about 180° C., such as by reactive extrusion. Preferably, a polyolefin having hindered phenol groups is added to the components prior to or during reacting the components together under heat. One or more non-functional polyolefins can be added to the components as a diluent prior to or during reacting the components. In some instances, the polyolefin having a plurality of reactive groups can be prepared in an up-feed location of an extruder and the subsequent reaction with a hindered phenol reagent in a down-feed location of the same extruder. Alternatively, the preparations can be carried out in separate reactive compounding processes.

Hindered phenol reagents that can be used in processes of the present disclosure can be represented by the following Formula (III).

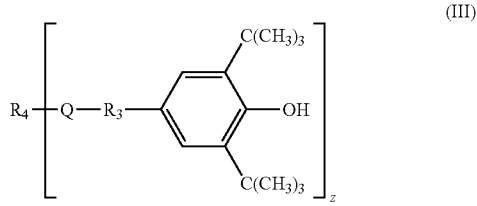

wherein Q represents —OOC—; $R_3$ represents a linker such as a $C_{1-8}$ linker, preferably a —$CH_2$—$CH_2$— linker; $R_4$ represents H or a substituted or unsubstituted alkyl group such as a $C_{1-30}$ alkyl unsubstituted or substituted with thiol, ether, ester linking groups within the $C_{1-30}$; and z is an integer from 1 to 4 when $R_4$ represents a substituted or unsubstituted alkyl group. An HP reagent containing ester or acid group can react with a remaining reactive group of the coupling agent.

In the case where a coupling agent having a plurality of the same or different functional groups, a product resulting from Scheme 1 can include a polyolefin having some unreacted MA residues in the PO chain and some unreacted functional groups (including —OH, —$NH_2$, and NHR groups) from the CA reagent to form a PO-(MA)(HP) (with optionally OH, —$NH_2$, and NHR groups).

As an alternative to employing a coupling agent to chemically bond an HP group to a polyolefin, a maleic anhydride modified polyolefin can be combined with a hindered phenol reagent to form a polyolefin having hindered phenol groups directly from the maelic anhydride residue. Scheme 2 below illustrates such a process.

Scheme 2. A process of preparing a functional polyolefin

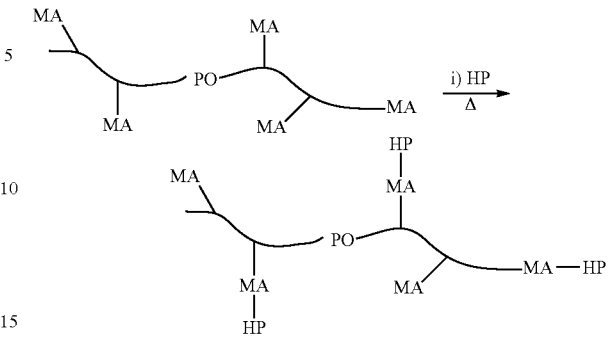

Scheme 2 shows a polyolefin having a plurality of maleic anhydride residues on the polyolefin in which some or all of such residues react with a hindered phenol reagent. As such, the hindered phenol groups are covalently bound to the polyolefin through a reaction residue formed from a maleic anhydride residue on the polyolefin and the hindered phenol reagent. Scheme 2 shows some maleic anhydride residues on the polyolefin chain that have not reacted as an example. In principal, all maleic anhydride residues are available to react with the hindered phenol reagent and one maleic anhydride can react with two hindered phenol reagents. The polyolefin chains can be represented by Formula (II) above and hindered phenol reagents can be represented by Formula (III) above, e.g., an HP reagent containing ester or acid group can react with a maleic anhydride residue.

Preparing a polyolefin having a plurality of hindered phenol groups directly from polyolefin modified maleic anhydride can be carried out by reacting a maleic anhydride modified polyolefin with a hindered phenol reagent under heat, e.g., by heating the components to at least about 180° C., such as by reactive extrusion. Preferably, a polyolefin having hindered phenol groups is added to the components prior to or during reacting the components together under heat. One or more non-functional polyolefins can be added to the components as a diluent prior to or during reacting the components.

As an alternative to reactive compounding, a functional polyolefin can be prepared by a solid state process by mixing a maleic anhydride modified polyolefin with a solvent for a hindered phenol reagent and the hindered phenol reagent to form either a slurry of wetted polyolefin particles or a suspension of polyolefin particles in the solvent.

For example, a solution or mixture can be prepared including a solvent for the hindered phenol reagent with or without a coupling agent, e.g., a compound having a plurality of reactive groups. The solution or mixture can be combined with polyolefin modified polymer particles to form a slurry. The slurry components can then be baked at a temperature of at least about 170° C., such as at least about 180° C., or at least about 200° C. and up to about 280° C., to effect the reaction between maleic anhydride residues on the polyolefin and the hindered phenol reagent and, if present, the coupling agent.

Alternatively, the solution or mixture including the solvent for the hindered phenol reagent, with or without a coupling agent, can be combined with maleic anhydride modified polyolefin polymer particles to form a suspension and the suspension heated. For a suspension process, it is preferable to use a high boiling solvent, e.g., a solvent with a boiling point of at least about 170° C. to about 235° C. to minimize evaporation of the solvent, and/or heating the components under pressure of greater than atmospheric pressure. The suspension can then be heated to at least about 170° C., such as at least about, 180° C., 190° C., 200° C., etc. to effect the reaction between maleic anhydride residues on the polyolefin and the hindered phenol reagent and, if present, the coupling agent.

In any of the solid state processes, a polyolefin having hindered phenol groups is preferably added to the components prior to reacting the components together under heat. One or more non-functional polyolefins can be added to the components as a diluent prior to reacting the components.

As an example of the versatility of processes of the present disclosure, a functional polyolefins can include a polyolefin chain covalently bound to a coupling agent, e.g., a hydroxylated polymer, by a reaction adduct between a maleic anhydride on a polyolefin chain and a reactive group on the coupling agent, e.g., a hydroxyl group on the hydroxylated polymer. Advantageously, functional polyolefins of the present disclosure can further include hindered phenol groups covalently attached to the coupling agent, e.g., the hydroxylated polymer. Such functional polyolefins having hindered phenols bound through a hydroxylated polymer can be represented by the following Formula (IV):

POC—(HP)$_a$(F1)$_b$(F2)$_c$(F3)$_d$   (IV)

wherein HP represents hindered phenol groups; F1, F2 and F3 independently represent functional groups such as F1 can be a maleic anhydride (MA) group, a reaction adduct between an MA group and a hydroxyl group, which can include COOH groups, primary and secondary amines, F2 can be a hydroxyl group (OH) and F3 can be an epoxy group, for example; a can range from 0 to about 10 mole percent (mol %), such as from about 0.1 mol % to about 10 mol %, e.g., from about 0.1 mol % to about 3 mol %, or about 0.2 mol % to about 1.5 mol %, b can range from 0 to about 5 mol %, such as from about 0.01 mol % to about 2 mol %, c can range from 0 to about 10 mol %, such as about 0.5 mol % to about 3 mol %, and d can range from 0 to about 5 mol %, such as from about 0.01 mol % to about 2 mol %, provided, however, at least one of a, b, or c is a value greater than zero, i.e., at least one of HP, F1, or F2 is present in the functional polyolefin. POC represents two or more polyolefin chains that are linked together through one or more ester linkages. The polyolefin chains can be represented by Formula (II) above.

In some embodiments, a is at least 0.15 mol %, e.g., at least about 0.3 mol %, 0.5 mol %, 1 mol %, 1.5 mol %, 2 mol % and higher. Polyolefins having hindered phenol groups bound thereto advantageously have improved thermal stability relative to polyolefins without the hindered phenol groups and such functional polyolefin advantageously can improve the thermal stability of a composition including the polyolefin having hindered phenol groups. Further, polyolefins having hindered phenol groups can undergo crosslinking to form crosslinked polyolefins.

As an example of the versatility of processes of the present disclosure, functional polyolefins of the present disclosure can be prepared via an elevated temperature reactive process by reacting the following components under heat: (a) a hydroxylated polymer having a plurality of hydroxyl groups; and (b) a polyolefin having a plurality of maleic anhydride groups. The maleic anhydride groups on the polyolefin can react with the hydroxyl groups of the hydroxylated polymer under heat to produce a functional polyolefin having two or more polyolefin chains covalently bound to the hydroxylated polymer through ester linkages. Also, the reaction adduct between the maleic anhydride residues on the polyolefin chain and hydroxyl groups on the hydroxylated polymer segment can form COOH groups from a partial reaction of the anhydride and alcohol.

In addition, functional polyolefins having hindered phenol groups can be prepared via an elevated temperature reactive process by reacting the following components under heat: (a) a hydroxylated polymer having a plurality of hydroxyl groups; (b) a polyolefin having a plurality of maleic anhydride groups; and (c) a hindered phenol reagent to produce a functional polyolefin having polyolefin chains covalently bound to the hydroxylated polymer and hindered phenol groups covalently bound to the hydroxylated polymer. In certain aspects of the present disclosure, a functional polyolefin having hindered phenol groups is prepared by first preparing a functional polyolefin from reactive polymers of (a) and (b) followed by reacting the product with (c) a hindered phenol reagent.

In preparing such functional polyolefins, a polyolefin having hindered phenol groups is added to the components prior to reacting the components together under heat. Such a polyolefin having hindered phenol groups reduces degradation of the starting reactive polymeric components during the reaction.

In practicing aspects of the present disclosure, the reactive components for preparing functional polyolefins are subjected to elevated temperature, for example, of more than 190° C., e.g., at least about 200° C., 210° C., 220° C., 230° C., 240° C., or higher. Preferably, the reactive components are subjected to temperatures in which the reactive polymeric components are in a molten state, i.e., above the melt temperature of the reactive polymeric components. The functional polyolefins can be prepared at elevated temperature by melt processes utilizing extrusion, compounding, injection molding, compression molding, etc.

For example, a reactive process can be carried out in a co-rotating and intermeshing twin-screw extruder, in which reactive polymers and chemical reagents are melted and mixed. The reaction sequence can begin with reacting a maleic anhydride modified polyolefin (e.g., a PE(MA) or a PP(MA)) and a hydroxylated polymer, such as EVOH copolymer or phenoxy resin, followed by reacting an HP reagent containing ester or acid group. Examples of hindered phenol reagents are provided in the Table 1 below.

TABLE 1

Examples of HP reagents

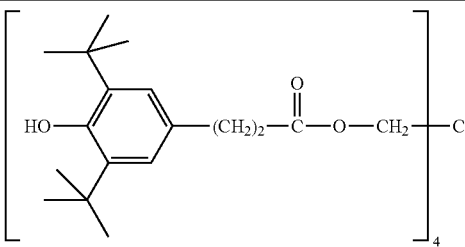

Irganox 1010

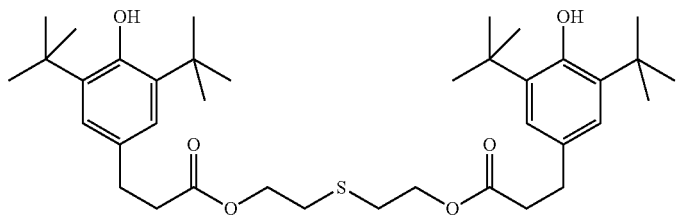 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

Irganox 1035

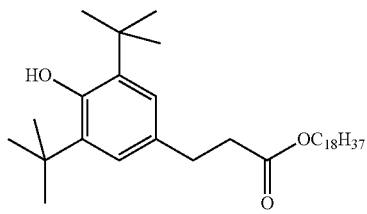

Irganox 1076

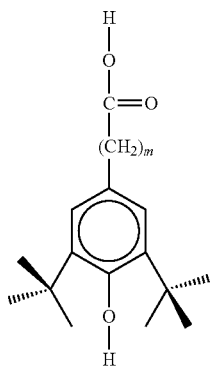

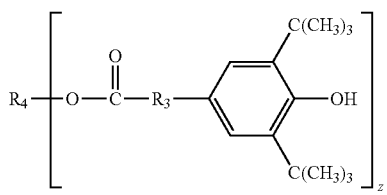

Optionally, a polyamine reagent can be added to optionally incorporate some amine moieties in the polymer structure. Additives, fillers, or engineering polymers optionally can be mixed dispersively and distributively into the melt to obtain a homogeneous mixing and achieve various polymer compositions and material properties.

The functional polyolefins and compositions can be formed as granules which are an advantageous form for use in other processes. It is also possible to directly carry out injection molding or extrusion of the functional polyolefins and compositions to form sheets or profiles to fulfill specific performance requirements. Such in situ processes can save energy and minimize material thermal stress that enhance product properties.

In practicing aspects of the present disclosure, functionalized polyolefins can include a variety of different functional groups in the same polyolefin structure such as HP, MA, and OH groups. However, for certain engineering plastics and substrates, both NH$_2$ and epoxy groups can also be present to enhance polyolefin interactive properties. Scheme 3 below illustrates a functional polyolefin having multiple polyolefin chains bonded to a center hydroxylated polymer segment, and various functional groups distributed in different polymer segments.

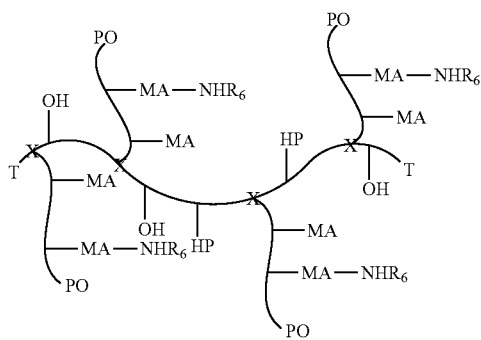

In Scheme 3, PO represents polyolefin chains, which can be represented by Formula (II) above. MA represents an anhydride-containing adduct formed after grafting maleic anhydride to a PO chain. MA-NHR$_6$ represents a reaction adduct between MA and polyamine reagent having more than 2 primary or secondary amino groups (R$_6$), such polyamines include, for example, natural polyamines, e.g., spermidine, spermine, synthetic polyamines such as diethylenetriamine, triethylenetetramine, tris(2-aminoethyl) amine, 1,1,1-tris(aminoethyl)ethane, polyethylenimine, a polyethylene polyamine, an alkyl diamine, an aromatic diamine, etc. X represents a reaction adduct between MA and OH group, e.g., an ester linkage coupling, T represents a terminal group, either H, OH, HP, or epoxy, in the hydroxylated center segment and HP represents a hindered phenol group, which can be represented by the following formula:

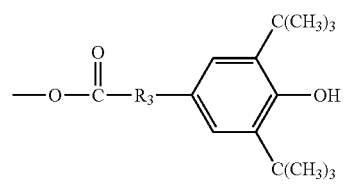

wherein R$_3$ represents a linker such as a C$_{1-8}$ linker, preferably a —CH$_2$—CH$_2$— linker. The HP group on the functional polyolefin can be formed from a condensation reaction between an OH group and a hindered-phenol reagent containing either ester or COOH moiety. In some aspects, the center hydroxylated polymer segment illustrated in Scheme 3 comprises a poly(ethylene-co-vinyl alcohol) (EVOH) copolymer. The number of PO segments chemically linked to the center hydroxylated segment can be an integer from 1-100, the number of MA groups in each PO segment is an integer from 0 to about 200, and the sum of HP and OH groups in the center segment is an integer from 100-10,000 with a [HP]/[OH] mole ratio from 1/100 to 100/1.

The introduction of multiple polar functionalities in polyolefin chain structures can be achieved by covalently bonding a PO-MA chain to a hydroxylated polymer, such as a poly(ethylene-co-vinyl alcohol) (EVOH) copolymer or a polyhydroxyether resin such as Phenoxy resin (available from Gabriel chemicals), which serve as a coupling agent. The hydroxylated polymer preferably contains many OH groups (such as a reactive OH group in every comonomer unit) along the polymer chains. A polyhydroxyether resin can also have OH or epoxy terminal groups.

In reacting a PO-MA with a hydroxylated polymer (P—OH), some of the OH groups in the hydroxylated polymer effectively engage in coupling reaction with maleic anhydride (MA) modified polyolefin (PE-MA or PP-MA) polymers during the compounding process and can form a graft polymer structure having multiple polyolefin chains bonded to the same hydroxylated polymer chain. In other words, a reactive compounded product via extrusion can have a multiple-segment polymer structure with a selected number of polyolefin chains connected to a center hydroxylated polymer segment. In addition, the plurality of OH groups in hydroxylated polymer segment also afford subsequent condensation reaction with some hindered-phenol (HP) antioxidant reagents, containing either ester or COOH moiety, during the compounding process. In other words, the center polymer segment not only connects several polyolefin chains but also provides many OH and HP functional groups in the final polymer structure. In some embodiments of the present disclosure, a functional polyolefin can have a multiple-segment polymer structure containing at least a combination of OH, HP, and MA functional groups. It is also relatively straight forward to include epoxy polar groups in the structure by choosing a polyhydroxyether resin with two terminal epoxy groups. Optionally, some remaining MA groups in the polyolefin chains can be used to introduce NH$_2$ moieties by reacting such a functional polyolefin with a polyamine or polyamide reagent.

Scheme 4 below illustrates another multi-functional polyolefin structure (A), contains several isotactic PP chains and HP moieties chemically bonded to an EVOH center segment, which is produced by a reactive compounding process involving maleic anhydride modified polypropylene (PP-MA) with poly(ethylene-co-vinyl alcohol) (EVOH) copolymer and hindered-phenol (HP) antioxidant reagent containing an either ester or COOH moiety. The final compounded product is a multiple-segment functional polyolefin structure containing three desirable polar functionalities (MA, HP, and OH groups), in which some unreacted MA units are located in PP chains, and HP and OH groups are present in the center segment.

Scheme 4. A preferred multi-functional polyolefin structures (A) with EVOH as the coupling agent, prepared by the combination of PP-MA, EVOH, and HP reagent using reactive compounding process.

PP—MA + EVOH + HP—COOH

↓ compounding

Structure (A)

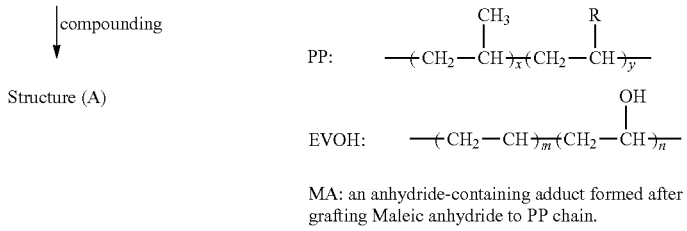

MA: an anhydride-containing adduct formed after grafting Maleic anhydride to PP chain.

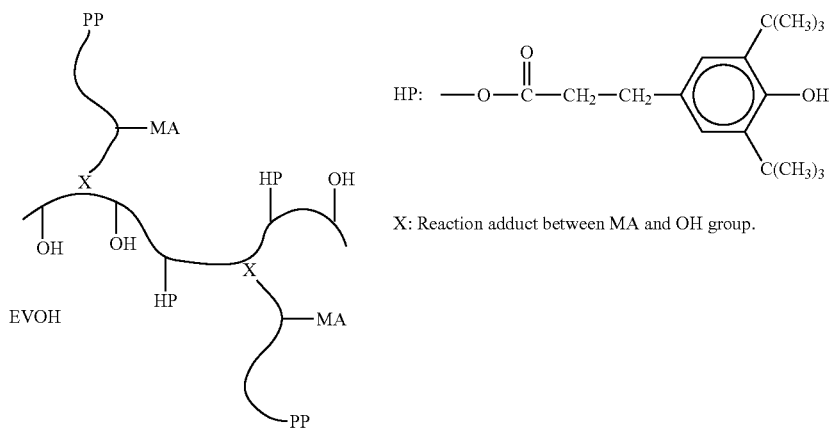

X: Reaction adduct between MA and OH group.

Where PP represents a polypropylene homo- or co-polymer with up to 10 mol % of comonomer content, R is H or $C_2$-$C_{10}$ substituted linear, branched, or cyclic alkyl or aryl moiety, x is an integer of at least 100, e.g., at least 500, at least 1,000, and up to about 50,000; y is an integer of at least 10, e.g., at least 100, at least 500, at least 1,000 and up to about 10,000; EVOH represents poly(ethylene-co-vinyl alcohol) copolymer segment, m is an integer between 0 to about 10,000, n is an integer from 100 to about 10,000; MA is an anhydride group bearing moiety formed after the grafting reaction of maleic anhydride onto the polyolefin chain. For this example, X is a reaction residue between MA and OH groups, HP is a hindered-phenol with an ethylene-ester linkage bonded to polymer chain, derived from a condensation reaction between OH group and a hindered-phenol antioxidant reagent containing either ester or COOH moiety. The number of PP segments chemically linked to the EVOH center segment is an integer range from 1-100, the number of MA groups in each PP segment is an integer ranging from 0-200, and the sum of HP and OH groups in the center segment is an integer ranging from 100-10,000 with a [HP]/[OH] mole ratio from 1/100 to 100/1.

Scheme 5 below shows another multi-functional and multiple-segment polyolefin structure (B). For this example, the functional polyolefin contains several PP chains (such as isotactic PP chains) and HP moieties chemically bonded to an polyhydroxyether center segment. The polyfunctional polyolefin can be produced by a reactive compounding process involving maleic anhydride modified polypropylene (PP-MA) with a polyhydroxyether resin (Phenoxy) and hindered-phenol (HP) reagent containing an either ester or COOH moiety. The final compounded product can be a multiple-segment functional polyolefin structure containing three desirable polar functionalities (MA, HP, and OH groups), in which some unreacted MA units are still present in PP chains, and HP and OH groups are present in the center polyhydroxyether segment.

Scheme 5. Example of a multi functional polyolefin structures (B) with phenoxy resin as the coupling agent, prepared by the combination of PP-MA, Phenoxy, and HP reagent using reactive compounding process.

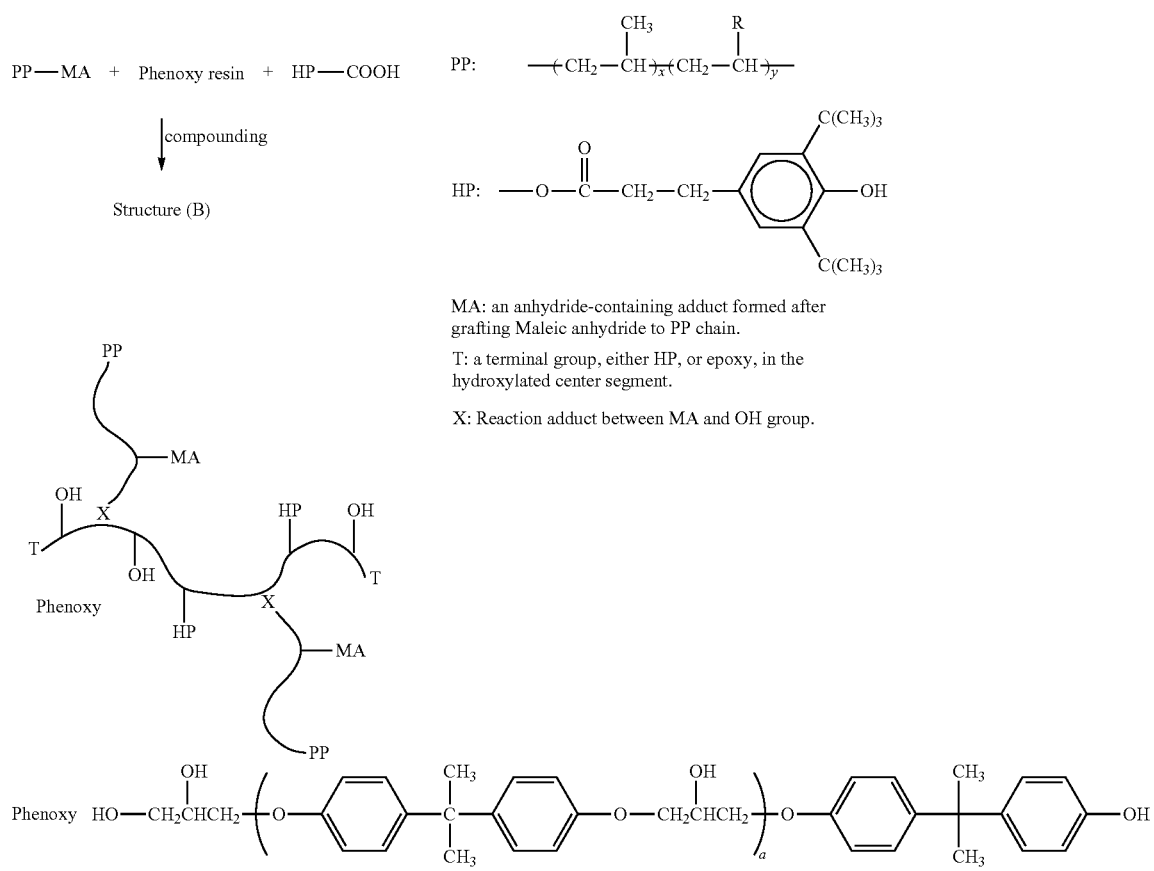

For this example, PP can represent a polypropylene homo- or co-polymer with up to 10 mol % of comonomer content, R is H or $C_2$-$C_{10}$ substituted linear, branched, or cyclic alkyl or aryl moiety, x is an integer of at least 100, e.g., at least 500, at least 1,000, and up to about 50,000; y is an integer of at least 10, e.g., at least 100, at least 500, at least 1,000 and up to about 10,000. Phenoxy can represent a polyhydroxyether chain derived from bisphenol A [($CH_3$)$_2$ C($C_6H_4OH$)$_2$] and epichlorohydrin [Cl—$CH_2$—($C_2H_3O$)], n is an integer from about 10 to about 10,000, MA is an anhydride group bearing moiety formed after the grafting reaction of maleic anhydride onto polyolefin chain. For this example, X is a reaction residue between MA and OH groups, HP is a hindered-phenol with an ethylene-ester linkage to the polymer, derived from a condensation reaction between OH group and a hindered-phenol reagent containing either an ester or COOH moiety, T is either HP or epoxy terminal group located at both ends of the phenoxy chain, which becomes center segment in the final structure. The number of PP segments chemically linked to the phenoxy center segment is an integer range from 1 to about 100, the number of MA groups in each PP segment is an integral range from 0 to about 200, and the sum of HP and OH groups in the center segment is an integral range from 100-10,000 with a [HP]/[OH] mole ratio from 1/100 to 100/1.

Preferably the functional polyolefins of the present disclosure are prepared by reactive compounding processes, e.g., reactive extrusion. As an example, a melt process can involve regular twin-screw extruders with specific reaction steps and operational conditions. For examples reported below, a co-rotating and intermeshing twin-screw extruder was used for reactive compounding, in which the reactive polymers and chemical reagents are melted and mixed in a sequence to minimize undesirable side reactions. For certain preparations, the reaction sequence starts with the reactive mixing between maleic anhydride modified polyolefin (PE-MA or PP-MA) and a hydroxylated polymer, such as EVOH or polyhydroxyether resin, then reacting one or more HP antioxidant reagents containing ester or acid group. Optionally, a polyamine reagent can also be added to incorporate some amine moieties in the polymer structure. Additives, fillers, or engineering polymers were then mixed dispersively and distributively into the melt to obtain the homogeneous mixing and achieve the desirable polymer compositions and material properties. The resulting multifunctional polyolefin materials can be formed as granules and later can be applied through other processes. It is also possible to directly carry out injection molding or extrusion to form sheets or profiles to fulfill specific performance requirements. This in situ process conserves energy and minimizes material thermal stress that enhances the product properties.

Another aspect of the present disclosure is to combine the functional polyolefin with other polymeric materials, e.g., polyolefins, such as non-functional polyolefins, including, without limitation, polyethylene and polypropylene and their various commercial variants as a blend of the respective polymers. In such blends, a relatively low amount of the functional polyolefin of the present disclosure can be used to significantly improve characteristics of the blend such as thermal stability. Functional polyolefins having HP groups of the present disclosure also can be combined with functional polyolefins without HP groups, such as polyolefins with maleic anhydride and/or hydroxyl groups and their reaction products, to significantly improve characteristics of the blend such as thermal stability.

Blending an PO—HP with another PO polymer can facilitate the following benefits: (a) uniform distribution of HP antioxidants in PO polymers, a higher concentration of HP (polar) antioxidants in the PO (nonpolar) matrix without phase separation, (c) the low mobility and volatility of covalently-bonded HP groups prevent loss through diffusion and/or extraction (particularly acute in films and coatings), (d) increase high temperature stability and reduced dielectric loss under high electric field conditions.

In some embodiments, functional polyolefin of the present disclosure can be further combined with another polymeric material in which the mole percent of HP groups based on the total polyolefin repeating units of the blend can be as low as about 0.01% or higher such as at least about 0.1%, e.g., at least 0.3% and can range from about 0.1% to about 1.0%, e.g., from about 0.3% to about 1.5%. In other embodiments, the mole percent of MA groups in the blend can be up to about 1%, such as up to about 0.5%, e.g., up to about 0.1%; the mole percent of OH groups in the blend can be up to about 2%, such as up to about 1%, e.g., up to about 0.3%. Advantageously, the blends can have an onset degradation temperature of no less than about 290° C., e.g., no less than about 300° C., 310° C., 320° C., 330° C., 340° C., etc. and values therebetween.

Another advantage of the functional polyolefins of the present disclosure is that they can co-crystalize with other polyolefins, functional or non-functional, when blended with the other polyolefins. Such co-crystallization promotes a homogeneous distribution of the functional polyolefin in a blend of polyolefins.

Another aspect of the present disclosure includes cross linked materials from polyolefins having hindered phenol groups prepared according to the present disclosure. Advantageously, polyolefins having hindered phenol groups can crosslink upon heating under the oxidative condition through coupling of the hinder phenol group. Such reactions are shown in Example 1 Scheme B below.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Example 1: Synthesis and Evaluation of PP—HP Copolymers Prepared by Polymerization of Monomers In this Example, we repeated the chemical method shown in Chung et al, Macromolecules, 2017:50:7041-7051 to prepare PP—HP copolymers and examined their thermal-oxidative stability.

1. Synthesis of PP—OH Copolymer

The OH group in 10-undecen-1-ol comonomer was protected by a silane group by the following process. In a 1 L flask, equipped with a magnetic stirrer, 34.46 g of 10-undecen-1-ol and 20.22 g of triethylamine were dissolved into 500 mL of THF. 21.72 g of chlorotrimethylsilane was slowly introduced at room temperature. A white powder appeared immediately. The suspension was stirred at 60° C. for 8 h, and the white powder was filtered and removed. The resulting yellow solution was distilled under vacuum, and the fraction at 60° C. was redistilled over $CaH_2$ to obtain the silane protected comonomer before use.

In a typical polymerization reaction, a dried Parr 450 mL stainless autoclave equipped with a mechanical stirrer was charged with 75 mL of toluene, 5 mL of MAO (5 wt % in toluene), and 2.0 g of 10-undecen-1-oxytrimethylsilane after purging with propylene gas. About 5 μmol of rac-Me$_2$Si[2-Me-4-Ph(Ind)]$_2$ZrCl$_2$ in the toluene solution was then syringed into the rapidly stirred solution under propylene pressure to initiate the polymerization. After 20 min of reaction at 40° C. under 120 psi pressure of propylene gas, the polymer solution was quenched with methanol. The resulting product was washed with HO/methanol (0.5M), methanol, and THF 2 times each and then vacuum-dried at 60° C. About 7.22 g of PP—OH copolymer was obtained with a catalytic activity of 4300 kg of polymer/(mol of Zr·h).

2. Synthesis of PP—HP Copolymer by Steglich Esterification

The PP—HP copolymer was synthesized by esterification of the PP—OH copolymer with 3,5-bis(tert-butyl)-4-hydroxyphenylpropionic acid in the presence of 1-(3-(dimethylamino)propyl)-3-ethylcarbodiimide (EDC) and 4-N,N-dimethylaminopyridine (DMAP). In a typical reaction run, under an argon atmosphere, 5 g of PP—OH copolymer with 1 mol % of OH content was mixed with 1.9 g of 3,5-bis(tert-butyl)-4-hydroxybenzoic acid, 0.19 g of DMAP, and 100 mL of toluene in a 500 mL round-bottom flask equipped with a stirrer and a condenser. After adding 1.15 g of the EDC reagent, the esterification reaction was carried out at 110° C. for 12 h. The resulting PP—HP copolymer was precipitated in 600 mL of methanol and then washed with methanol a few times before drying the polymer overnight in a vacuum oven at 70° C.

Scheme A below illustrates a synthetic route via monomers to prepare PE-HP and PP—HP copolymers with high molecular weight, controlled HP comonomer content, and high yield.

Example 1 Scheme A

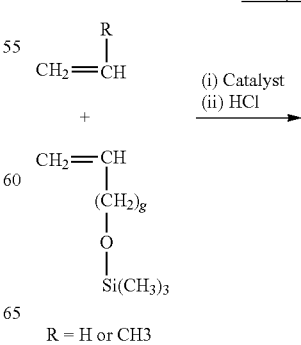

-continued

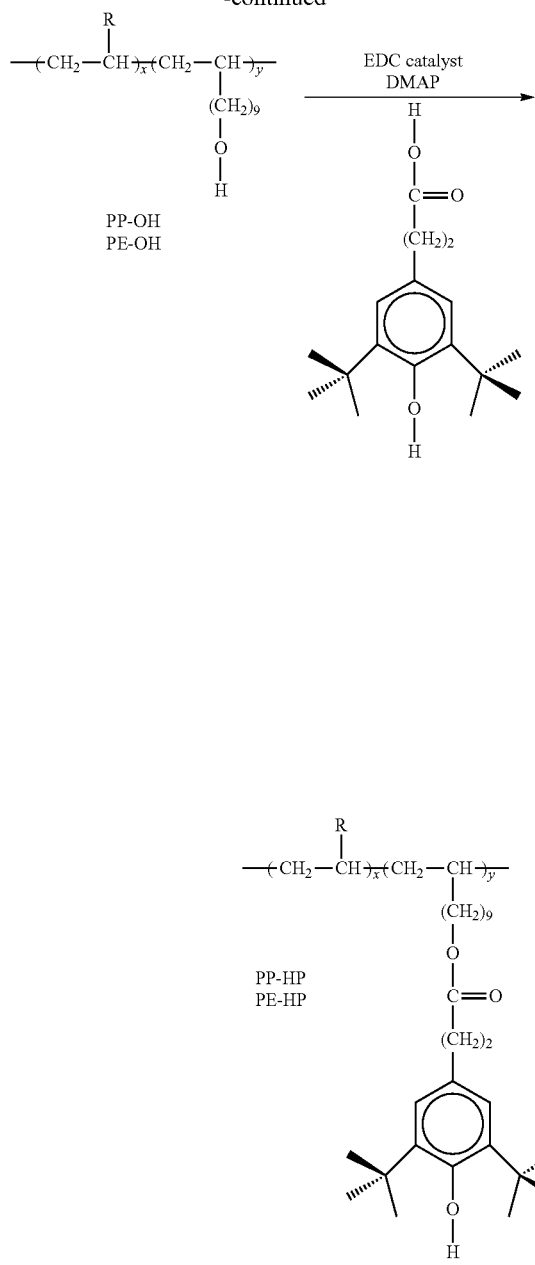

PP-OH
PE-OH

PP-HP
PE-HP

Each HP moiety provides four hydrogen atoms to react with four polymeric radicals due to oxygen oxidation of polyolefin chains and finish with a dimerization reaction between two oxidized HP groups to form a long conjugated bis-quinonemethide group. This reaction mechanism not only offers the protection of polyolefin chains from thermal-oxidative degradation, but also forms a complete crosslinked x-PE and x-PP polymer network (Scheme B below). In other words, instead of weakening mechanical strength in most commercial polyolefin products, PE-HP and PP—HP copolymers become stronger materials upon exposure to high temperature oxidative conditions.

Example 1 Scheme B

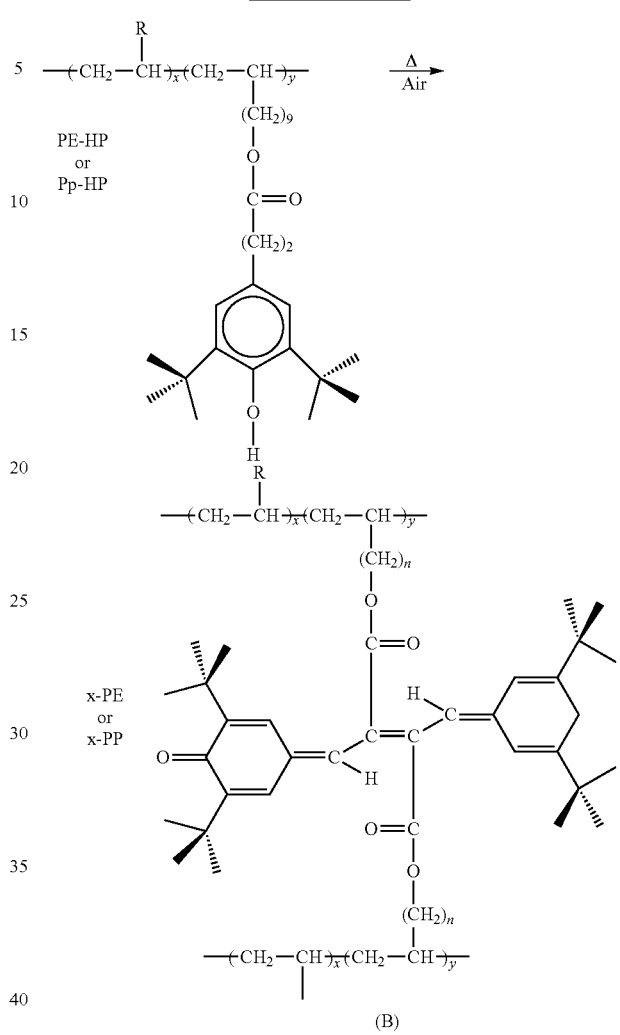

PE-HP
or
Pp-HP x-PE
or
x-PP (B)

3. TGA Study to Examine PP—HP Thermal-Oxidative Stability

As discussed, the PP thermal-oxidative stability is a major concern during polymer processing and applications. Commercial PP products usually contain a small amount (<0.5 wt %) of hindered phenol (HP) antioxidants and other stabilizers to prevent polymer chain degradation.

From work of Chung et al, Macromolecules, 2019:52: 5618-5637, thermogravimetric analysis (TGA) can be used as a simple measure of evaluating thermal stability both qualitatively and quantitatively. Specifically, the onset of degradation temperature ($T_d$) in a TGA, defined here as the temperature when a material experiences a 5% weight loss under conditions of heating in air at 10° C./min, was found to be consistent with other stability measures. The 5% number is selected to eliminate potential effect of volatiles such as residual solvent or moisture from the process. Additional weight loss in a TGA curve can be influenced by different degradation components and complicates the interpretation when different functional groups are involved. Samples can be tested from pellets, powder, strand or films, with films preferred to acquire a representative section for the measurement. Sample films are typically 50 μm to 100 μm in thickness.

FIG. 1 compares the TGA degradation curves of three polypropylene samples including: (a) a commercial capacitor grade PP as received (from Borealis, catalog No. Borclean Capacitor grade), (b) a dry-mixed commercial PP with HP additive (Irgonox 1010), and (c) a chemically-bonded HP functionalized PP—HP. The capacitor grade PP is a well-formulated product containing >0.3 weight % (wt %) of Irganox® 1010 antioxidant and other stabilizers. The dry-mixed commercial PP with HP additive contains 1.6 wt % of HP powder (Irgonox 1010, equivalent to 0.2 mole %). The dry-mixed commercial PP with HP additive shows a minor reduction in weight loss up to $T_d$ without any significant overall improvement in thermal stability compared to the commercial capacitor grade PP. However, the chemically-bonded HP (PP—HP) polymer shows an overall improvement in thermal stability even at relatively low dosage of HP (0.2 mole %). In some cases (discussed later), PP—HP at 0.5 mole % or higher can be processed at above 330° C. without any sign of degradation. Again, in-air TGA and $T_d$ will be used as an initial screening method to evaluate thermal stability and whether there is a chemical attachment of the HP to the polyolefin.

Figure 2:
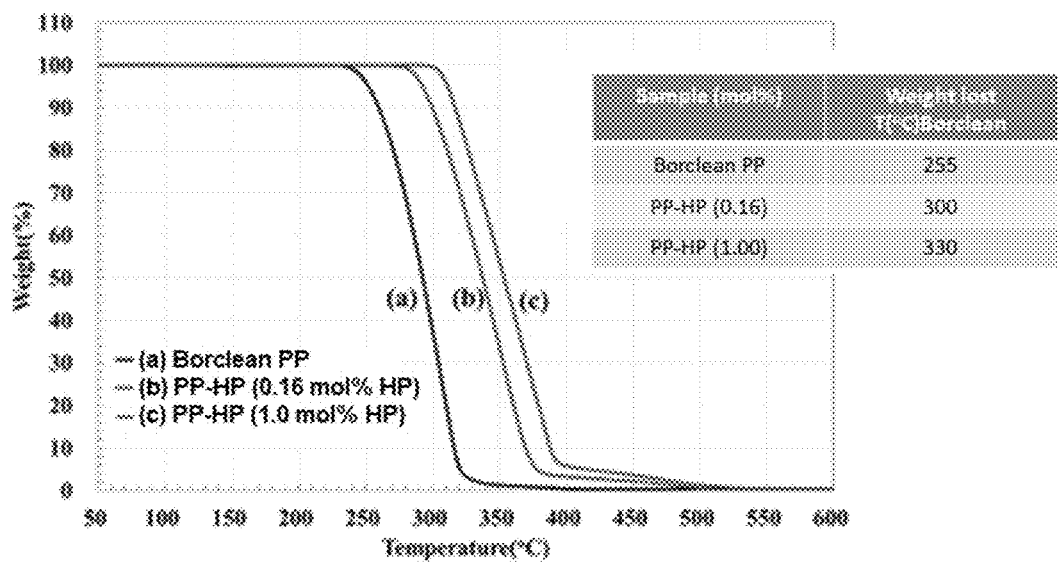
FIG. 2 is a plot comparing TGA curves among a commercial capacitor-grade PP (Borclean) and two PP—HP copolymers with 0.16 mol % and 1.0 mol % HP groups, respectively, prepared according to aspects of the present disclosure.

FIG. 2 is a plot comparing TGA curves among a commercial capacitor-grade PP (Borclean) and two PP—HP copolymers with 0.16 mol % and 1.0 mol % HP groups, respectively. The onset degradation temperature for the sample in FIG. 2 is provided in the Table 2 below.

TABLE 2

Onset degradation temperature of various samples determined by TGA analysis conducted at a heating rate of 10° C./min in air

| Sample (mol % of HP) | Onset of degradation temperature ($T_d$) (° C.) |
|---|---|
| Borclean PP | 255 |
| PP—HP (0.16) | 300 |
| PP—HP (1.0) | 330 |

Under a heating rate of 10° C./min in air, the well-formulated capacitor-grade PP (containing Irganox® 1010 antioxidant and other stabilizers as an admixture) degraded at $T_d$ of about 255° C. On the other hand, both PP—HP copolymers with 0.16 mol % and 1.0 mol % HP concentration show significantly higher thermal-oxidative stability with onset degradation temperatures of $T_d$ of about 300° C. and about 330° C., respectively. These data show that the $T_d$ of covalently bound HP in a polyolefin (e.g., PP—HP) increases proportionally with increasing mol % of the HP component bound to the polyolefin. In contrast, an admixture of PP and HP, i.e. a dry-mixed PP/HP blend as shown in FIG. 1, shows no significant change in onset degradation temperature of $T_d$ compared to PP alone. These data (and data further below) further show that PP—HP at 0.5 mole % or higher can be processed at above 300° C. without measurable degradation.

The experimental results clearly show that when a sufficient quantity of HP antioxidants are homogeneously distributed in a PP matrix, the thermal stability of the polyolefin is improved. However, the polar nature of hindered phenols make them incompatible with semicrystalline non-polar PP polymers and simply admixing hindered phenols to polyolefins results in the HPs diffusing to the surface of the polymer which leads to a non-uniform mixture over time. In contrast, when HP groups are chemically bound to a polyolefin, the polyolefin-HP itself has significantly improved thermal-oxidative stability and the polyolefin-HP can be used as an antioxidant to improve the thermal-oxidative stability of other polymers and polyolefins.

The PP—HP copolymers synthesized via solution process with monomers and the thermal-oxidative stability data provided in FIG. 2 will be used as a benchmark for evaluating the thermal-oxidative stability of functional polyolefins prepared according to process of the present disclosure.

Preparation of Polyolefins Having Functional Groups Via Reactive Compounding

The following examples were performed via reactive compounding (e.g., reactive extrusion) using Coperion 26 mm co-rotating twin-screw extruder, fitted with a mixing screw and 44 L/D ratio. Note: all compositions cited below in reactive compounding are in weight percent, unless specified otherwise such as in molar percent. Further, all temperatures cited below for reactive extrusion relate to the temperature of the extruder unless specified otherwise. The temperature of the components in the extruder is typically 10-20° C. higher than the extruder during normal processing due to shearing.

Example 2: Preparation of Functional PP Polymers Via PP-MA and a Multi-Segmental Polymer Structure (A) Using EVOH Copolymer Coupling Agent As explained for Scheme 4 above, a reactive compounding process was applied to prepare multi-functional PP structure (A) with HP, OH, and MA functional groups distributed in various polymer segments. The process involved a condensation reaction between PP-MA and poly (ethylene-co-vinyl alcohol) (EVOH) copolymer, followed by reacting the intermediate with a hindered-phenol (HP) antioxidant reagent including either an ester or COOH moiety. The resulting product was a multi-segment PP structure which included three desirable polar functionalities (HP, MA, and OH groups), in which HP and OH groups are present in the center polymer segment with optional unreacted MA units located in PP chains. The detailed reaction steps are described below:

1. Grafting Reaction Between PP-MA and EVOH Coupling Agent to Form PP—(OH)(MA) Intermediate PP-MA polymer having about 0.8 mol % of MA content was covalently bound to a EVOH polymer (the EVOH polymer had an approximate 45/55 ethylene/vinyl alcohol mole ratio) by reactive compounding. In most compounding processes, we also introduced commercial PP homopolymer to obtain a blended composition and to reduce costs. During the reactive compounding process, PP homopolymer acts as a diluent and does not substantially, if at all, participate in the chemical reaction between the PP-MA and EVOH grafting reaction. In a typical run, the following materials were initially dry mixed: PP (75-90%), PP-MA (up to about 10% and in some experiments between about 1-2%), EVOH (up to 15% and in some experiments between about 2-6%) and PP—HP (as a stabilizer, preferably 5-10%, from Example 1). The materials were dry-mixed in a standard pellets blender. The resulting pellet blend was then reactively compounded through co-rotating twin screw extruder at 220-240° C. to form the PP—(OH)(MA) intermediate. Note that the process above used PP—HP polymer prepared in Example 1 as a stabilizer. Without PP—HP, degradation was observed when attempting to react PP-MA and EVOH polymer through co-extrusion. Under the reactive compounding condition with PP—HP stabilizer, most of the MA moieties in the PP-MA chain can react with the OH groups in EVOH chain via esterification reactions to form the graft copolymer (multi-segment) structure with the PP chains (side segments) bonded to an EVOH chain (center segment). As expected, there are still some unreacted MA units (or unreacted COOH groups formed during the reaction of MA and OH) and excess OH groups in the resulting PP—(OH)(MA) polymer structure. Typically, this polymer intermediate (which in these examples also includes PP homopolymer) includes 2.5-7.5 mol % of OH groups that can be used to chemically bond HP antioxidant groups.

2. Reaction Between PP—(OH)(MA) and HP Reagent to Form PP—(HP)(OH)(MA) Multi-Functional Polymers The intermediate PP—(OH)(MA) prepared in step 1 above (including non-functional PP) was further mixed with Irganox® 1010 containing 4 HP groups in the co-rotating twin screw extruder at 200-240° C., with the weight ratio of PP—(OH)(MA) polymer (80-90%) and Irganox 1010 (10-20%). Transesterification reaction between ester groups in Irganox® 1010 molecule and OH groups in PP—(OH)(MA) polymer takes place to incorporate HP groups into the polymer structure. The final PP—(HP)(OH)(MA) polymer includes a concentration of about 1-2.5 mol % of HP groups and some unreacted OH and MA groups, with a segmental polymer structure as shown in Structure (A) in Scheme 4 above.

Note, the final compounded product for this example was a polymer blend with about 65-90% PP and about 10-35% PP—(HP)(OH)(MA) functional polymer. The multi-functional PP—(HP)(OH)(MA) polymer can serve as polymeric antioxidant, adhesion promotor, compatibilizer, etc. with a variety of polyolefins and in many applications.

Example 3: Evaluation of Thermal-Oxidative Stability of PP—(HP)(OH)(MA) Polymers Following the procedures of Example 2, we prepared a series of blends that included reactive compounded functional polyolefins, PP—(HP)(OH)(MA), with non-functional PP polymer, with an overall HP concentration in the range from 0.15 to 1.20 mol %.

Figure 3:
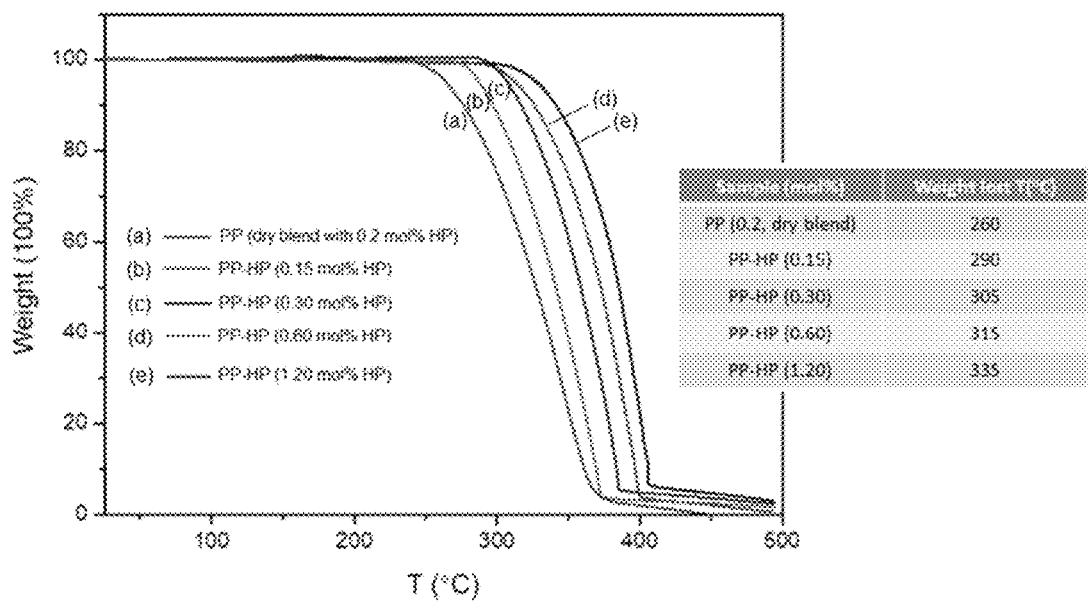
FIG. 3 is a plot comparing TGA curves of: (a) a dry blend PP/HP sample with 0.2 mol % HP content to four reactive compounded PP—(HP)(OH)(MA) polymers with varying amounts of HP content blended with PP polymer prepared according to aspects of the present disclosure.

FIG. 3 is a plot comparing TGA curves of a dry blend PP/HP sample with 0.2 mol % HP content to four reactive compounded PP—(HP)(OH)(MA) polyolefins prepared with varying amounts of HP blended with (75-90%) PP polymer. The TGA was conducted at a heating rate of 10° C./min in air for all samples in FIG. 3. Samples were taken from a film prepared by a hot press from pellets having a thickness from about 70 µm to about 80 µm; the TGA unit was a TA Instruments Model Q50. The onset degradation temperature ($T_d$) of the samples plotted in FIG. 3 is provided in the Table 3 below.

TABLE 3

Onset degradation temperature of various samples determined by
TGA analysis conducted at a heating rate of 10° C./min in air.

| Sample (mol % of HP) | Onset of degradation temperature ($T_d$) (° C.) |
| --- | --- |
| (a) PP (0.2, dry blend) | 260 |
| (b) PP—HP (0.15) | 290 |
| (c) PP—HP (0.30) | 305 |
| (d) PP—HP (0.60) | 315 |
| (e) PP—HP (1.20) | 335 |

As can be seen from FIG. 3, the PP/HP dry blend sample with 0.2 mol % HP antioxidant content (reference sample) begins a sharp weight loss after reaching a $T_d$ of about 260° C. As also seen from FIG. 3, the four samples that included non-functional PP polymer blended with PP—(HP)(OH)(MA) polyolefins prepared by reactive compounding showed a superior improvement in thermo-oxidative stability. The four samples that included non-functional PP polymer blended with PP—(HP)(OH)(MA) polyolefins with an overall total amount of HP content of 0.15, 0.30, 0.60, and 1.20 mol % showed an $T_d$ of 290° C., 305° C., 315° C., and 335° C., respectively. All four samples that included a polyolefins having covalently bound HP exhibited much improved thermal stability, with the onset decomposition temperature proportional to the overall HP content of the sample. In addition, the thermal-oxidative stability of the reactive compounded samples was not adversely affected by the presence of OH and MA groups bound to the polyolefin.

Figure 4:
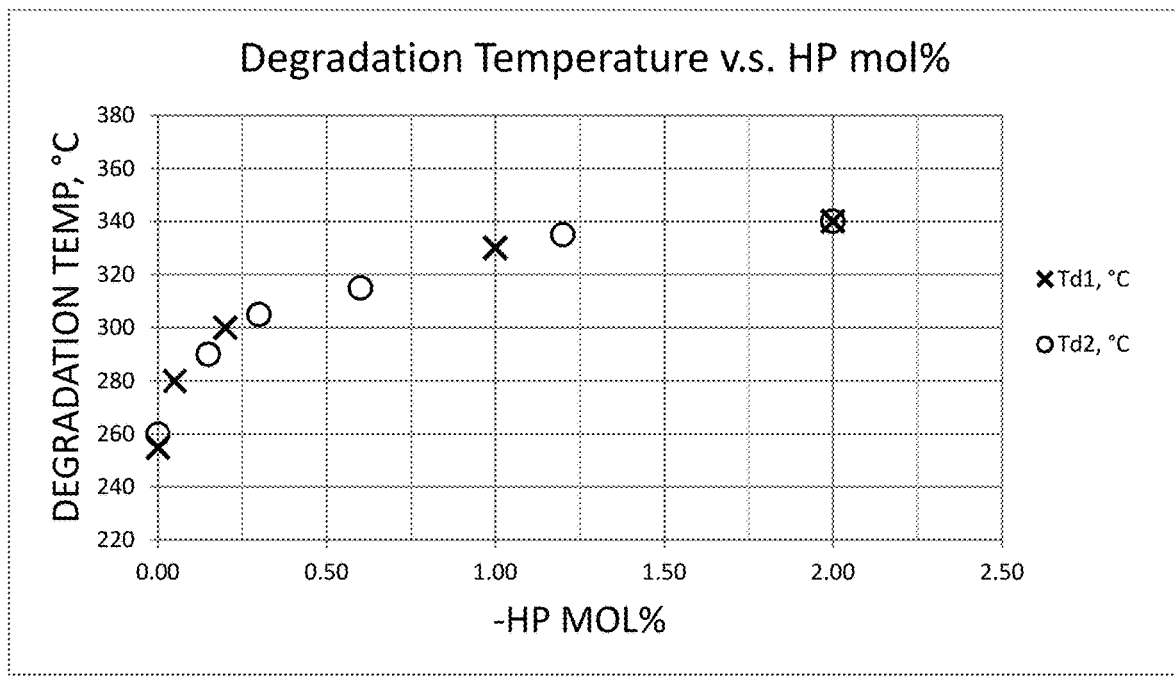
FIG. 4 is a plot of onset degradation temperature ($T_d$) versus HP mol % for samples of polypropylene with hindered phenol prepared by different processes including samples prepared by monomer synthesis (X Td1) and by reactive compounding (O Td2).

To further show that HP can be covalently bound to a polyolefin by reactive compounding, we compared thermal characteristics of reactive compounded PP—(HP)(OH)(MA) polyolefins prepared according to Example 2 and PP—HP prepared according to a monomer synthetic route (e.g., Example 1). In this regard, FIG. 4 compares $T_d$ temperatures for various samples made by the monomer synthesis of Example 1 and by the reactive compounding route of Example 2. The data in FIG. 4 labeled with an "X" represents onset degradation temperature prepared by monomer synthesis (X Td1) and the data labeled with an "0" represents onset degradation temperatures for samples made by reactive extrusion (O Td2). The plot also shows the degradation temperature of starting materials (i.e., point having zero mol % HP). Table 4 below lists certain onset degradation data for samples in FIG. 4 and an onset degradation temperature of a dry blended PP/HP admixture for comparison.

TABLE 4

Onset degradation temperature of various samples determined by
TGA analysis conducted at a heating rate of 10° C./min in air

| Sample (mole % of HP) | Onset Degradation Temperature ($T_d$) |
| --- | --- |
| PP (dry blend with 0.2 mole % HP) † | 260° C. |
| PP—HP (0.15 mol % HP) (Reactive Compound) †† | 290° C. |
| PP—HP (0.16 mol % HP) (Monomer Synthesis) ††† | 300° C. |
| PP—HP (0.30 mol % HP) (Reactive Compound) | 305° C. |
| PP—HP (0.60 mol % HP) (Reactive Compound) | 315° C. |
| PP—HP (1.0 mol % HP) (Monomer Synthesis) | 330° C. |
| PP—HP (1.20 mol % HP) (Reactive Compound) | 335° C. |

† Commercial grade PP (Borclean) which is a PP dry mixed with Irganox ® 1010 antioxidant (HP) and other stabilizers
†† (Reactive Compound) in the table above refers to a reactive compounded PP—(HP)(OH)(MA) polymer made according to Example 2.
††† (Monomer Synthesis) refers to a PP—HP prepared according to Example 1.

As shown in FIG. 4 and Table 4 above, the data show that, irrespective of whether the sample was prepared by monomer synthesis (Example 1) or by reactive compounding (Example 2), the onset degradation temperature depends on the molar content of HP. The higher the molar HP content, the higher the onset degradation temperature and slower the weight loss. The data in FIG. 4 and Table 4 demonstrate that the reactive compounding process results in HP covalently bound to a polyolefin, e.g. polypropylene.

The data in FIG. 4 and Table 4 also show that polyolefin having covalently bound HP, e.g., a PP—(HP)(OH)(MA) polyolefin, is an effective polymeric antioxidant. As explained above in Example 2, the PP—(HP)(OH)(MA) polyolefin was prepared as a blend with non-functional polypropylene. And as seen by the data in FIG. 4 and Table 4, the reactive compounded PP—(HP)(OH)(MA) polyolefin can be used as antioxidant for polypropylene itself. The data further show that the PP—HP samples made by Examples 1 or 2 with a lower amount of HP have a superior onset degradation temperature than a dry blend of PP admixed with an hindered phenol antioxidant (HP).

The examples show that PP—(HP) polyolefin has an additional advantage over commercial antioxidants in that it can co-crystalize with PP and thus result in a more uniform PP and PP—(HP) blend with a homogeneous distribution of HP antioxidant groups throughout the entire PP material. The homogeneously distributed HP groups are highly effective in protecting PP from thermal-oxidative degradation under elevated temperatures.

Example 4: Increasing MA or/and OH Concentrations in PP and PP—(HP)(OH)(MA) Blends Following the reaction sequence in Example 2, in many cases the consecutive reactive compounding reactions consume most of MA groups in PP-MA polymer and OH groups in EVOH polymer. To increase MA and OH groups in a PP and PP—(HP)(OH)(MA) blend, an additional reactive compounding procedure was followed by mixing the blend from Example 2.2 with either PP-MA to increase MA content or with PP—(OH)(MA) (from Example 2.1) to increase OH content, or both PP-MA and PP—(OH)(MA) to increase both MA and OH contents. The reactive compounding was carried out in the same co-rotating twin screw extruder from about 210° C.-230° C. Because the co-crystallization capability among all these PP polymers (including functional PP polymers and PP homopolymer), the resulting reactive blends exhibit a uniform morphology with a homogeneous distribution of all HP, OH, and MA functional groups in the entire PP material.

Example 5: Preparation of Functional PP Polymer Via PP-MA and a Multi-Segmental Polymer Structure (B) Using Phenoxy Resin Coupling Agent Following similar procedures described for Example 2, we also prepared another class of functional PP polymer having a multiple-segment polymer structure (B) shown in Scheme 5. Maleic anhydride modified polypropylene (PP-MA) was also reacted with a phenoxy polymer as the coupling agent to prepare multi-functional PP structure (B) with three desirable functional groups (e.g., HP, OH, and MA). The reaction steps are described below:

1. Grafting Reaction Between PP-MA and Phenoxy Resin to Form PP—OH(MA) Intermediate The PP-MA polymer was mixed with PP homopolymer and a phenoxy resin. The composition of the mixture included PP-MA polymer (from 10-20%, preferably from 10-15%), phenoxy resin (from 5-15%, preferably 5-10%), PP—HP (as stabilizer from Example 1 from 5-10%), and PP homopolymer (70-85% or balance of the blend composition). In the mixture, the MA concentration is in the range of 0.1-0.15 mol % and OH concentration is in the range of 1-3 mol %. The mixture was prepared by dry-mixing in a standard pellets blender. The resulting pellet blend was then reactively compounded through co-rotating twin screw extruder at 220-240° C. to form an PP—(OH)(MA) intermediate. Similar to Example 2-1, the preferred process above uses PP—HP as an antioxidant to prevent thermal-oxidative degradation of the polyolefins (PP, PP-MA). Under the reactive compounding condition in this Example, most of MA moieties in PP-MA chain react with OH groups in phenoxy chain via esterification reaction to form the graft copolymer structure with the PP chains (side segments) bonded to a phenoxy chain (center segment). As expected, there are some unreacted MA (or residue COOH) groups and excess OH groups in the resulting PP—OH(MA) graft polymer structure.

2. Reaction Between PP—OH(MA) and HP Reagent to Form PP—HP(OH)(MA) Structure (B)

Following a similar procedure in Example 2-2, the resulting PP—OH(MA) intermediate (containing PP homopolymer) was further mixed with Irganox®1010 carrying 4 HP groups in a ratio of about 80-90% PP—OH(MA) to about 10-20% Irganox®1010. Transesterification reaction between ester groups in Irganox 1010 molecule and OH groups in PP—(OH)(MA) takes place in the co-rotating twin screw extruder at 220-260° C. The final PP—(HP)(OH)(MA) polymer structure (B) contains HP antioxidant groups (about 1-2.5 mol %) with some unreacted OH and MA groups. Note, the final compounding product is a polymer blend containing 70-85% PP homopolymer with PP—(HP)(OH)(MA) functional polymer (15-30%) which can serve as a polymeric antioxidant, adhesion promotor, compatibilizer, etc.

Comparative Example: Reactive Compounding of PP-MA and EVOH without PP—HP

For this comparative example, no PP—HP was used in a mixture of PP-MA and EVOH polymer. The following materials were initially dry mixed: PP, PP-MA and EVOH in a standard pellets blender. The resulting pellet blend was then compounded through co-rotating twin screw extruder at 220-240° C. However, the materials degraded forming low molecular weight product with significantly reduced viscosity indicating a lack of polymeric material.

Example 6: Preparation of PP—HP Polyolefin Directly from PP-MA

1. Reaction Between PP-(MA) and HP Reagent to Form PP—HP(MA) Via Reactive Extrusion A maleic anhydride modified polypropylene (PP-MA) was reactively compounded with a HP reagent such as Irganox 1010 with PP—HP as a stabilizer. The process can be performed via a co-rotating twin screw extruder at about 200-260° C., preferably from about 230° C. to about 240° C.

The rate of production by this process was somewhat limited by the removal of byproducts from the reactive compounding with the equipment used. A standard compounder with ventilation can produce PPHP with up to about 2.5 mol % HP, using a weight ratio of PPHP-MA polymer (80-90%), feeding Irganox 1010 (10-20%) with upstream or downstream.

2. Reaction Between PP-(MA) and HP Reagent to Form PP—HP(MA) Via Solid State Reaction A blend of PP-MA with PP—HP as a stabilizer (5-10%) in pellet form was mixed with mineral spirits (MS) at 1 part pellets to 3 parts MS. The resulting mixture is then stirred and heated to at about 130-135° C. for about 30 min forming a suspension that when cooled turns into a waxy mixture at room temperature. This waxy mixture is then blended with acetone at about 1 to 3 ratio at room temperature to be filtered into a wet powder of fine particles. The filtered wet powder is then mixed with acetone solution saturated with Irganox 1010 at a molar ratio of one part MA to 2 to 8 part HP, preferably 1:4 ratio. The wet mixture is then baked at 220° C. in an oven for a minimum of about 1 hr., preferably 2 hr. The resulting product is a light tan granule that can be powderized for further processes.

3. Reaction Between PP-(MA) and HP Reagent to Form PP—HP(MA) Via Suspension

A blend of PP-MA with PP—HP as a stabilizer (5-10%) in pellet form was mixed with about 1 to 0.5-2 molar ratio Irganox 1010 (MA to HP), preferably 1 to 1 ratio, in a high temperature mineral spirit. The above suspension is then heated to about 170 to 235° C., preferably 180 to 185° C. for a minimum of about 90 min., preferably 120 min. A waxy mixture is formed upon cooling to room temperature that is then blended with hexane at a ratio of 1 to 3 by weight. The hexane suspension is then filtered at room temperature and dried at 150° C. in an oven to remove MS/hexane. The resulting PP(MA)-HP product is a light tan powder with high HP mole %.

Example 7: Preparation of Functional PP Polymer Via PP-MA and a Multifunctional Amine Compound Coupling Agent 1. Reaction Between PP-(MA) and Diamine to Form PP-(MA)(NH$_2$) Via Solid State Suspension Reaction A blend of PP-MA with PP—HP as a stabilizer (5-10%) in pellet form was mixed with about a 1 to 0.5-2 molar ratio of MA to aromatic/aliphatic diamine, e.g., a 1 to 1 ratio, with a reaction medium, e.g., mineral spirit, to form a suspension. A diaminodiphenyl sulfone was used as the coupling agent for certain processes. The above suspension is then heated to about 120-145° C., e.g., about 130 to 135° C., for at least about 20 min., such as at least 30 min., Irganox 1010 is then added after heating at about a 1 to 2-4 molar ratio to aromatic/aliphatic diamine, e.g., about a 1 to 4 ratio. The above suspension is then heated to about 170 to 235° C., such as about 180 to 185° C. for at least about 60 min., such as about 90 min. A waxy mixture is formed upon cooling to room temperature that is then blended with hexane at a ratio of about 1 to 3 by weight. The hexane suspension is then filtered at room temperature and heated to at least about 200° C., e.g., about 220° C., in an oven to remove the MS/hexane. The resulting product is a light tan granule that can be powderized for further processes.

Based on our experiments, we found that the thermal oxidative stability of functional polyolefins having hindered phenol groups covalently bound thereto and blends thereof were a direct function of the concentration of HP. Further, the thermal oxidative stability did not appear to be affected by the inclusion of reactive function groups also covalently bound to the polyolefin. In addition, the thermal stability did not appear dependent on the process for preparing the PO—HP or whether the HP was bound to the polyolefin via a coupling agent or directly. Data in FIG. 5 and Table 5 below, illustrate our findings.

TABLE 5

Effect of HP composition on Degradation temperature (Td)

| Sample ID | Sample (mol % of HP)$^a$ | Onset Degradation Temperature ($T_d$)* |
|---|---|---|
| T1 | Commercial PP (dry blend with 0.2 mol % HP)$^b$ | 260° C. |
| T2 | PP—HP (0.15 mol % HP) (via —OH, P1)$^c$ | 290° C. |
| T3 | PP—HP (0.16 mol % HP) (via —OH, P0)$^c$ | 300° C. |
| T4 | PP—HP (0.30 mol % HP) (via —OH, P1)$^c$ | 305° C. |
| T5 | PP—HP (0.60 mol % HP) (via —OH, P1)$^c$ | 315° C. |
| T6 | PP—HP (0.80 mol % HP) (via —NH$_2$, P3)$^c$ | 320° C. |
| T7 | PP—HP (1.0 mol % HP) (via —OH, P0)$^c$ | 330° C. |
| T8 | PP—HP (1.20 mol % HP) (via —OH, P1)$^c$ | 335° C. |
| T9 | PPHP (2.4 mol % HP) (via —MA, P2)$^c$ | 350° C. |
| T10 | PPHP (3.6 mol % HP) (via —MA, P2)$^c$ | 350° C. |

*Td is determined by TGA at a heating rate of 10° C./min in air.

$^a$Except for reference sample T1, mol % is the total calculated attached HP composition from different reaction steps.

$^b$Sample T1 is a commercial PP dry mixed with Irganox ® 1010 antioxidant (HP).

$^c$P0 relates to processing via solution-based polymerization of monomers as in Example 1; P1 relates to processing via reactive extrusion; P2 relates to processing via solid state reaction as in Example 6.2 (baking) and P3 relates to processing via solid state reaction as in Example 7 (suspension).

Figure 5:
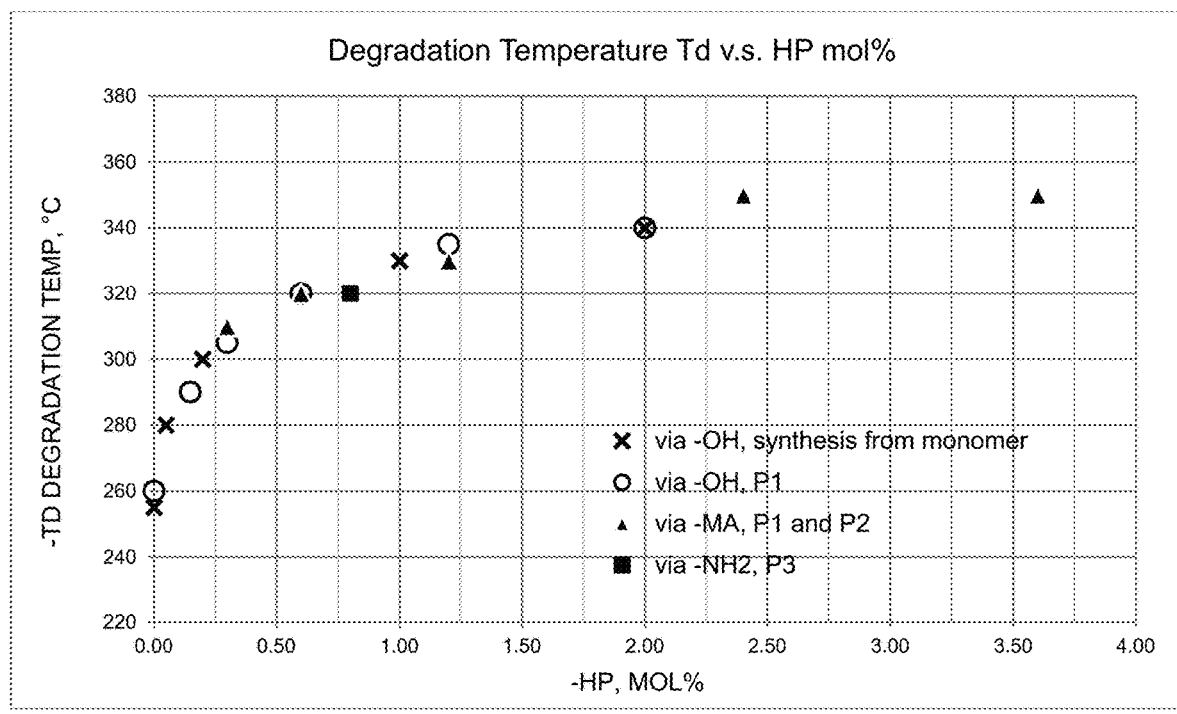
FIG. 5 is a plot of onset degradation temperature ($T_d$) versus HP mol % for samples of polypropylene having hindered phenol covalently bound thereto that were prepared by different processes according to aspects of the present disclosure.

FIG. 5 is a plot comparing Ta temperatures for various PP(HP) samples made by the monomer synthesis of Example 1 (labeled X) to samples made via a coupling agent having hydroxy groups (labeled O) or a coupling agent having amine groups (■) or a PP(HP) made by directly bonding HP to PP(MA) (▲). The plot also shows the degradation temperature of starting materials (i.e., points having zero mol % HP). Table 5 above lists certain onset degradation temperature data for samples in FIG. 5 and an onset degradation temperature of a dry blended PP/HP admixture for comparison. The data further, show that PP(HP) prepared according to aspects of the present disclosure can be effective thermal oxidative stabilizers for polyolefins having reactive function groups also covalently bound to the polyolefin.

As shown in FIG. 5 and Table 5 above, the data show that, irrespective of whether the sample was prepared by monomer synthesis (Example 1) or by reactive compounding or solid state processes, the onset degradation temperature depends on the molar content of HP. The data further confirms that reactive compounding process and solid state reactions described herein result in HP covalently bound to a polyolefin, e.g. polypropylene.

Example 8: Long Term Thermal Stability of PP—HP Versus an Admixture of PP with HP A PP—HP was prepared by reactive extrusion having a 0.3 mol % of HP, assuming all HP reagent was covalently bound to the PP. A sample of PP admixed with HP was prepared to have also a 0.3 mol % of HP in the admixture. The HP used in the samples was Irganox 1010 powder manufactured by BASF. Table 6 below shows the onset degradation temperature of the as prepared samples (before heating) and after heating the samples at 150° C. for 80 hours (in air).

TABLE 6

Comparison of thermal stability of PP(HP)(MA) to PP(MA) + HP (powder)

| Samples | Composition (mol %) | | Td ° C. (by TGA) | |
|---|---|---|---|---|
| | —HP | HP[3] Dry-blend | Before Heating | Heating in air, @150° C./80 h |
| PP—HP[1] | 0.3 | 0 | 310 | 310 |
| PP + HP[2] | 0 | 0.3 | 310 | 300 |

[1]PP—HP was prepared by reactive compounding and the mol % HP assumes HP was covalently bound to the PP.
[2]PP + HP was prepared by dry-blend of PP and HP powder.
[3]HP used for the samples was Irganox 1010 powder manufactured by BASF.

As shown by the data in Table 6, the thermal stability of a polyolefin having covalently bound hindered phenol maintains its thermal stability over an extended period time compared to an admixture of hindered phenol.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A functional polyolefin having the following Formula:

$$PO-(HP)_a(F1)_b(F2)_c(F3)_d(F4)_e \quad (I)$$

wherein PO represents a polyolefin; HP represent a hindered phenol group; F1 represents a maleic anhydride residue, and/or a reaction residue of maleic anhydride residue; F2 represents a hydroxyl group; F3 represents an epoxy group; F4 represents an amine group; the variable a ranges from about 0.1 mol % to about 10 mol %, the variable b ranges from greater than 0 to about 10 mol %, the variables c and e independently range from 0 to about 40 mol %, provided the sum of c and e is no more than 40 mol %, and the variable d ranges from 0 to about 20 mol %; wherein the functional polyolefin is formed from a hindered phenol reagent containing an ester moiety having the following formula:

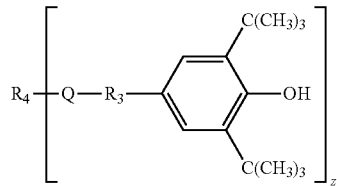

wherein Q represents —OOC—; $R_3$ is a $C_{1-8}$ linker; $R_4$ represents a substituted or unsubstituted alkyl; and z is an integer of 1 to 4.

2. The functional polyolefin of claim 1, wherein the variable a ranges from about 0.1 mol % to about 3 mol %.

3. A functional polyolefin having covalently bound thereto: (i) hindered phenol groups and (ii) maleic anhydride residues, or reaction residues of maleic anhydride residues, or both maleic anhydride residues and reaction residues of maleic anhydride residues;
wherein the functional polyolefin is formed from a hindered phenol reagent containing an ester moiety having the following formula:

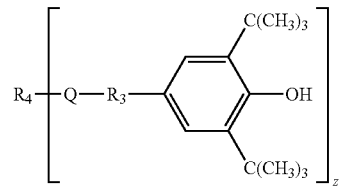

wherein Q represents —OOC—; $R_3$ is a $C_{1-8}$ linker; $R_4$ represents a substituted or unsubstituted alkyl; and z is an integer of 1 to 4.

4. The functional polyolefin of claim 3, further having covalently bound thereto any one of epoxy groups, or amine groups.

5. The functional polyolefin of claim 3, wherein the hindered phenol groups are covalently bound to the polyolefin through coupling agent.

6. The functional polyolefin of claim 5, wherein the coupling agent comprises a polymer.

7. The functional polyolefin of claim 5, wherein the coupling agent comprises a compound.

8. The functional polyolefin of claim 3, wherein the hindered phenol groups are covalently bound to the polyolefin through a reaction residue formed from a maleic anhydride residue on the polyolefin and the hindered phenol reagent.

9. The functional polyolefin of claim 3, wherein the functional polyolefin is crosslinked.

10. A blend comprising the functional polyolefin of claim 3 and a different polyolefin.

11. The blend of claim 10, wherein the onset degradation temperature of the blend is no less than about 290° C.

12. The functional polyolefin of claim 1,
wherein z is 4.

13. The functional polyolefin of claim 1, wherein PO represents a polypropylene, the variables c, d and e are 0 mol % and the hindered phenol reagent has the following formula:

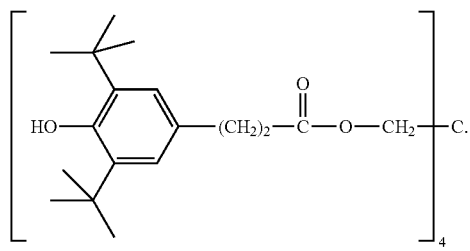

14. The functional polyolefin of claim 1, wherein PO represents a polypropylene.

15. The functional polyolefin of claim 1, wherein the variables c, d and e are 0 mol %.

16. The functional polyolefin of claim 1, wherein the variables c, d and e are 0 mol %, the variable a ranges from about 0.1 mol % to about 3 mol % and the variable b ranges from about 0.01 mol % to about 5 mol %.

17. A blend comprising the functional polyolefin of claim 1 and a different polyolefin, wherein the onset degradation temperature of the blend is from 290° C. to 340° C.

18. The functional polyolefin of claim 3, wherein $R_4$ represents an unsubstituted alkyl.

19. The functional polyolefin of claim 3, wherein the functional polyolefin includes a polypropylene.

20. The blend of claim 10, wherein the onset degradation temperature of the blend is no less than 310° C.

* * * * *